United States Patent
Sasaki et al.

(10) Patent No.: US 9,397,897 B2
(45) Date of Patent: Jul. 19, 2016

(54) ASSISTANCE SYSTEM

(75) Inventors: Hiromi Sasaki, Kyoto (JP); Hiroshi Yoshida, Shiga (JP); Shintaro Iwamura, Shiga (JP); Masaki Namie, Osaka (JP)

(73) Assignee: OMRON CORPORATION, Kyoto (JP)

( * ) Notice: Subject to any disclaimer, the term of this patent is extended or adjusted under 35 U.S.C. 154(b) by 143 days.

(21) Appl. No.: 14/005,356

(22) PCT Filed: Mar. 23, 2011

(86) PCT No.: PCT/JP2011/056943
§ 371 (c)(1),
(2), (4) Date: Nov. 8, 2013

(87) PCT Pub. No.: WO2012/124154
PCT Pub. Date: Sep. 20, 2012

(65) Prior Publication Data
US 2014/0059440 A1  Feb. 27, 2014

(30) Foreign Application Priority Data
Mar. 15, 2011  (JP) ................................ 2011-056397

(51) Int. Cl.
*G06F 3/048* (2013.01)
*H04L 12/24* (2006.01)
*G05B 19/05* (2006.01)

(52) U.S. Cl.
CPC ............ *H04L 41/145* (2013.01); *G05B 19/056* (2013.01); *H04L 41/12* (2013.01); *H04L 41/22* (2013.01); *G05B 2219/13164* (2013.01); *G05B 2219/23043* (2013.01)

(58) Field of Classification Search
None
See application file for complete search history.

(56) References Cited

U.S. PATENT DOCUMENTS 5,790,119 A * 8/1998 Sklut ..................... G06F 3/1296
399/82
2009/0171629 A1  7/2009 Hirose
(Continued)

FOREIGN PATENT DOCUMENTS

JP  2001-320393  11/2001
JP  2006-285757  10/2006
(Continued)

OTHER PUBLICATIONS

International Search report for PCT/JP2011/056943, mail date is Jun. 21, 2011.
(Continued)

*Primary Examiner* — William Trapanese
(74) *Attorney, Agent, or Firm* — Greenblum & Berstein, P.L.C.

(57) ABSTRACT

Provided is a design assistance system that enables a user having no expert knowledge to easily design a network system, taking into consideration the order in which slave devices are connected and the connection-destination ports. The design assistance system has a storage section that stores slave information data in which unique information of the slave device is described; an acquisition section that acquires information of a port of the slave device from the slave information data; and a generation section that generates a port component serving as a GUI component representing the port of the slave device based on the information of the port, generate a device component serving as a GUI component representing the slave device based on the slave information data, and generate a design assisting GUI containing a topology display screen that displays the topology of the network system which includes the device component and port component.

12 Claims, 18 Drawing Sheets

(56) References Cited

U.S. PATENT DOCUMENTS

| | | | |
|---|---|---|---|
| 2012/0144364 A1* | 6/2012 | Lau et al. | 717/103 |
| 2013/0031501 A1* | 1/2013 | Kodosky | G06F 3/04842 715/771 |

FOREIGN PATENT DOCUMENTS

| | | |
|---|---|---|
| JP | 2007-235349 | 9/2007 |
| JP | 2008-97551 | 4/2008 |
| JP | 2010-218083 | 9/2010 |
| JP | 2010-220161 | 9/2010 |
| WO | 2008/001704 | 1/2008 |

OTHER PUBLICATIONS

U.S. Appl. No. 14/005,324 to Hiromi Sasaki et al., filed Sep. 16, 2013.

U.S. Appl. No. 14/005,305 to Hiromi Sasaki et al., filed Sep. 16, 2013.

* cited by examiner

ASSISTANCE SYSTEM

TECHNICAL FIELD

The invention relates to a design assistance system.

BACKGROUND ART

In factory automation, production facilities placed in a factory are controlled by a field network over which various types of slave devices which collect and control data of the production facilities and a master device which conducts central control on these slave devices are connected to each other via a communication bus. FIG. 18 is a diagram showing an example of configuration of the field network. In FIG. 18, a field network 100 is built if a master device 200 (programmable logic controller: PLC) and a plurality of slave devices 300 are connected to each other directly or indirectly via a cable 400 or an I/O unit 500 that is included in the devices 300. The slave devices 300 may each include a power supply unit, a motor unit, a counter unit, an image unit, a communication unit, an I/O unit, etc. The communication bus may take on various topologies such as a line, a daisy chain, a tree, and a start, depending on the standard of the field network. To the master device 200, a management device 600 may be connected which is used by a user to set operations of the master device 200, display operation states of the field network 100, and design a network system. The management device 600 is made up of a personal computer etc. in which setting tools are installed.

Patent Document 1 discloses a technology for displaying an access path between a virtual volume of a storage control device having external connection functions and an external volume of an external storage system.

Patten Document 2 discloses a bus communication system that includes a master device and a plurality of slave devices connected to the master device in a daisy chain via a communication bus and can continuously use some of the slave devices rather than stopping all of the slave devices if a switching section is opened accidentally.

Patent Document 3 discloses displaying an image in which an interface unit is attached to a programmable indicator such that if a unit portion is selected in the attachment image, information of the interface unit corresponding to the unit portion may be displayed.

Patent Document 4 discloses a technology of a network device having a plurality of ports, the network device including an indicator lamp that is turned on and off and a display which displays contents about the ports searched for in a database in which set information of the network device is held.

Patent Document 5 discloses a technology for providing hierarchical image display of inter-port connections of an intelligence switch of a network.

PRIOR ART DOCUMENT

Patent Documents

Patent Document 1: JP 2006-285757 A
Patent Document 2: JP 2007-235349 A
Patent Document 3: JP 2008-97551 A
Patent Document 4: JP 2010-220161 A
Patent Document 5: JP 2001-320393 A

SUMMARY OF THE INVENTION

Problems to be Solved by the Invention

In an industrial network system such as an EtherCAT, order of slave devices which process frames is important. However, in a case where the slave devices are not connected to appropriate ones of a plurality of connection ports of a branching slave device, the frames are not processed in the intended order. In such a case, inter-slave communication by which, for example, the downstream side slave device utilizes information written by the upstream side slave device will not function as intended.

Therefore, in design of the industrial network system, it is important to take into consideration the inter-slave device connection order (parent-child relationship) and distinguish between the ports of the branching slave device. However, the conventional design assistance system has found it difficult to grasp the connection order and the port information. In a case where a user having no expert knowledge or experiences of SEs designs a network system or builds a real machine, a problem occurs in that such a design assistance system cannot easily design a network system that meets requirements of the user.

In view of the problems, the invention has been developed, and it is an object of the invention to provide a design assistance system by which even a user having no expert knowledge can easily design a network system, taking into consideration the inter-slave device connection order and the connection-destination ports.

Means for Solving the Problem

The invention provides a design assistance system for assisting design of a network system in which at least one slave device joins to a communication bus drawing a line, tree, or star topology from a master device as a starting point, the network system being formed by interconnecting ports of each of the master and slave devices, the design assistance system including:

a display configured to display a design assistance GUI;

a control device configured to control the GUI which is displayed on the display; and an input device configured to permit a user to input a command configured to operate the GUI, wherein the control device includes:

a storage section configured to store slave information data in which unique information of the slave device is described;

an acquisition section configured to acquire information of a port of the slave device from the slave information data; and a generation section configured to generate a port component serving as a GUI component representing the port of the slave device, based on the information of the port, generate a device component as a GUI component representing the slave device, based on the slave information data, and generate a design assistance GUI containing a topology display screen configured to display a topology of the network system, under design, which includes the device component and the port component.

By the design assistance system, the port components representing the ports of the slave devices composing the network system under design are displayed on the topology display screen, so that a user can design the network system, taking into consideration the ports. Therefore, by the design assistance system, the user can easily design also a network system in which the ports interconnecting the slave devices influence a path to distribute data and order in which the data is processed.

The invention can be identified also as a design assistance system including at least some of the means and as a program that causes a computer to function as the design assistance system.

For example, a program according to the invention assists design of a network system in which at least one slave device joins to a communication bus drawing a line, tree, or star topology from a master device as a starting point, the network system being formed by interconnecting ports of each of the master and slave devices and, if executed by a computer having a display configured to display a design assistance GUI and an input device configured to permit a user to input a command configured to operate the GUI, causes the computer to function as a storage section configured to store slave information data in which unique information of the slave device is described; an acquisition section configured to acquire information of a port of the slave device from the slave information data; and a generation section configured to generate a port component serving as a GUI component representing the port of the slave device, based on the information of the port, generate a device component serving as a GUI component representing the slave device, based on the slave information data, and generate a design assistance GUI containing a topology display screen configured to display a topology of the network system, under design, which includes the device component and the port component.

A design assistance method according to the invention assists design of a network system in which at least one slave device joins to a communication bus drawing a line, tree, or star topology from a master device as a starting point, the network system being formed by interconnecting ports of each of the master and slave devices, the design assistance method causing a computer having a display configured to display a design assistance GUI and an input device configured to permit a user to input a command configured to operate the GUI to perform the steps of: storing slave information data in which unique information of the slave device is described; acquiring information of a port of the slave device from the slave information data; and generating a port component serving as a GUI component representing the port of the slave device, based on the information of the port, generating a device component serving as a GUI component representing the slave device, based on the slave information data, and generating a design assistance GUI containing a topology display screen configured to display a topology of the network system, under design, which includes the device component and the port component.

Effect of the Invention

By the design assistance system of the invention, even the user having no expert knowledge can easily design a network system, taking into consideration order in which slave devices are connected and connection-destination ports.

MODE FOR CARRYING OUT THE INVENTION

Figure 1:
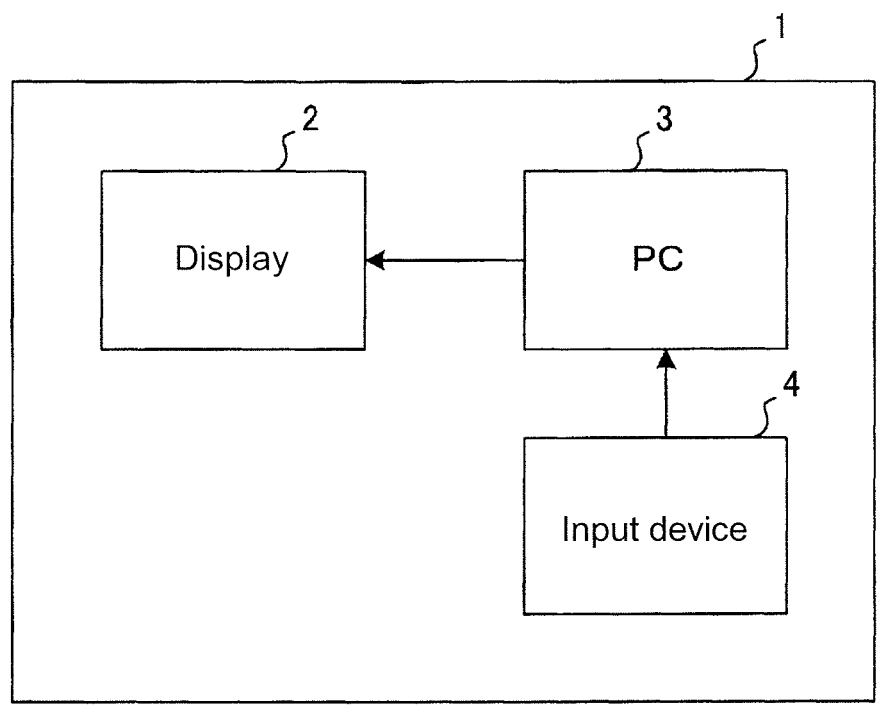
FIG. 1 is a block diagram showing an outlined configuration of a design assistance system according to an embodiment.

FIG. 1 is a block diagram showing the outlined configuration of a design assistance system according to the present embodiment. The design assistance system is configured to assist design of a network system in which at least one slave device joins to a communication bus which draws a line, tree, or star topology from a master device as a starting point. The network system is an industrial field network formed by interconnecting ports of each of the master and slave devices and can be illustrated as, for example, an EtherCAT-standard network system. The EtherCAT network system has two types of connection interfaces provided to the slave device, namely an external bus (RJ45) and an internal bus (E-Bus). The design assistance system of the present embodiment is not limited in application to design of an EtherCAT network system, and the port connection interface may be of any types other than the external and internal types.

A design assistance system 1 has a display 2 which displays a design assistance graphical user interface (GUI), a personal computer (PC) 3 configured to control the GUI displayed on the display 2, and an input device 4 which is configured by a keyboard or mouse with which a user provides the PC 3 with commands to operate the GUI. The design assistance system 1 enables the user to design a network system off-line. The design assistance system 1 may be configured in a manner such that the user can input commands to a network system on-line by connecting to a real machine of this network system, for example, a master device (PLC).

Figure 2:
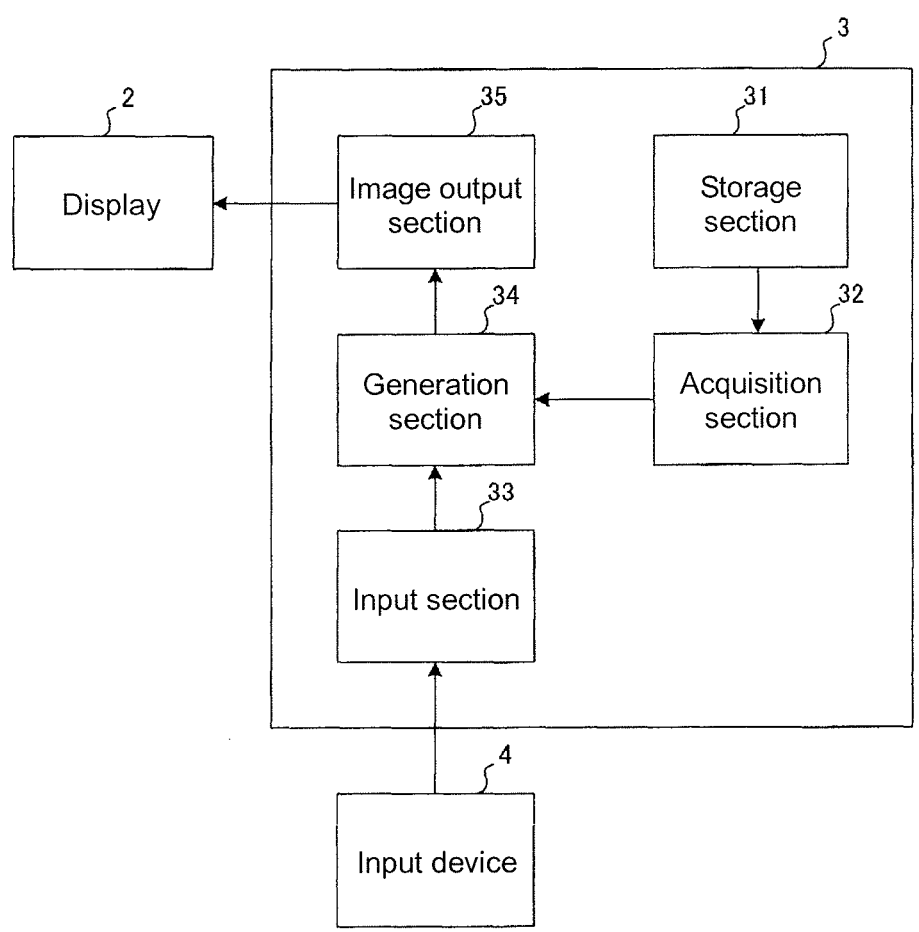
FIG. 2 is a block diagram showing an outlined functional configuration of a PC according to the embodiment.

FIG. 2 is a block diagram showing an outlined functional configuration of the PC 3. The PC 3 has a storage section 31, an acquisition section 32, an input section 33, a generation section 34, and an image output section 35.

The storage section 31 stores slave information data in which unique information of the slave device is described. The slave information data describes a model number of the slave device, identification information of a vendor, and information of ports of the slave device in, for example, an XML format.

The acquisition section 32 acquires the information of the slave device ports from the slave information data stored in the storage section 31. The information of the ports contains, for example, the number of the ports of the slave device, the type of a port connection interface (internal bus or external bus), and the identification information (name etc.) of the ports.

The input section 33 receives a signal incoming from the input device 4 and provides the generation section 34 with a command.

The generation section 34 generates a design assistance GUI in response to a command input from the input section 33. Further, the generation section 34 generates image data that can be displayed on the display 2 based on data of the generated GUI and outputs the image data to the image output section 35. The GUI generated by the generation section 34 will be described later.

The image output section 35 provides the display 2 with image data input from the generation section 34.

The PC 3 includes publicly known components such as a CPU, a memory, a disk, various types of input/output interfaces, and a bus connecting them, which are not shown, so that the storage section 31 is made up of an ROM, an RAM, or a hard disk drive (HDD) which is connected to the CPU via the bus. The acquisition section 32 and the generation section 34 are realized when the CPU reads a network system design assistance program installed in the HDD etc. from a disk and executes the program. The input section 33 and the image output section 35 are each made up of a mouse connection terminal, a keyboard connection terminal, or a display connection terminal which is connected to the CPU via the bus.

Figure 3:
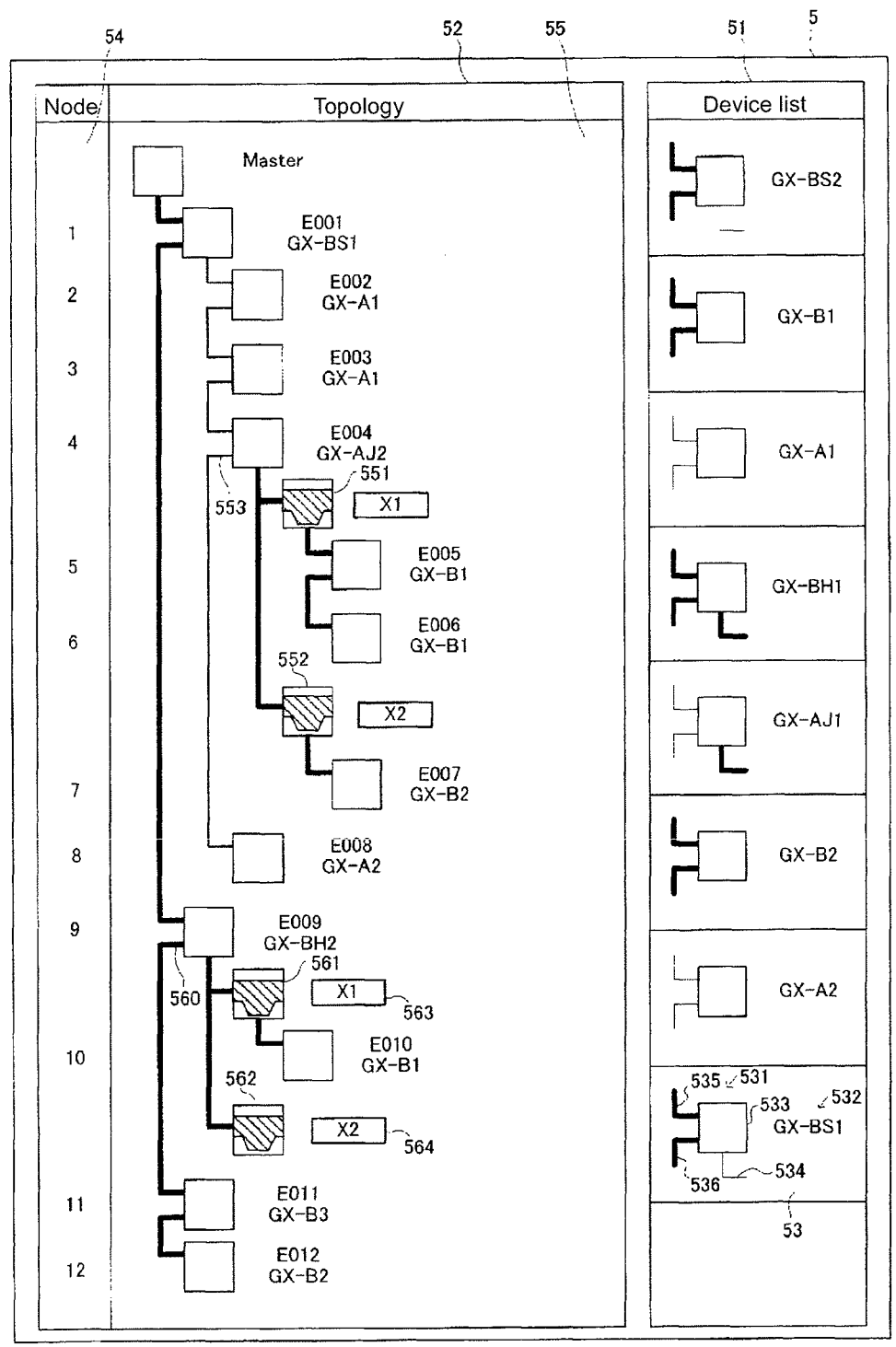
FIG. 3 is a view showing one example of a design assistance GUI generated by the design assistance system according to the embodiment.

FIG. 3 is a view showing one example of a design assistance GUI generated by the generation section 34 in the PC 3. A design assistance GUI 5 of the present embodiment roughly includes two panes, namely a device list display screen 51 and a topology display screen 52. The GUI 5 could include various screens not shown in FIG. 3 such as a screen for setting the master and slave devices, a screen for programming, and a screen for displaying detailed specifications of the slave device, which are omitted in the present embodiment for simplification of explanation.

The device list display screen 51 is configured to display a list of the slave devices that can join to a network system under design. Item components 53 enumerated on the device list display screen 51 include a text 532 and a device component 531 serving as a GUI component that represents the slave device.

The device component 531 includes an icon component 533 given as an illustration etc. which visualizes a slave device type or a manufacturer name and line components 534, 535, and 536 which represent ports of the slave device.

Each of the line components represents each of the ports, the number of the line components represents the number of the ports of the slave device, and the color or the line type of the line component represents the type of a connection interface for each of the ports. In this case, it is assumed that a bold line represents a connection interface for the external bus and a thin line represents that for the internal bus. Further, the line component represents an inport or an outport, depending on where the line component is positioned. An inport is used to connect the slave device closer to the master device than the local terminal in a topology, while an outport is used to connect the slave device more distant from the master device than the local device in the topology. In this case, it is assumed that the line component 535 which extends from the left side of the icon component 533 and then upward represents an inport, while the line component 536 which extends from the left side of the icon component 533 and then downward represents an outport. Further, in the case of the device component representing a branching slave device having a branching port at which the communication bus branches off, the branching port is represented by the line component positioned to the bottom of the icon component. The slave device represented by the device component 531 is a branching slave device having a branching port at which an external bus branches off to an internal bus. As shown in the FIG. 3, the line component 534 representing a branching port for branching to internal bus is positioned to the bottom of the icon component 533. The text 532 indicates the model number of the slave device or the name of a vendor.

By the device component 531, the user can know that this slave device is an external bus-connected branching slave device having one branching port for the internal bus and has a model number of "GX-BS1".

By the device list display screen 51, the user can obtain information such as the vendor name and the model number of the slave device that can be newly jointed to a network system under design, the number of its ports, and the type of a connection interface for the ports. In particular, the user can easily know the type of the connection interface for the port of the slave device and whether a branching port exists, so that by a GUI having the device list display screen 51, it is possible to easily assist selecting slave devices that can be newly jointed to the network system under design and selecting connection-destination slave devices.

The method of displaying a list of the slave devices on the device list display screen 51 is not limited to that described above. For example, it may be considered to provide a display aspect to further enrich information display for each slave device by increasing the number of GUI components given as the item components 53 or a display aspect to improve listing performance by decreasing the number of GUI components given as the item components 53. Further, another display aspect may be possible to narrow down the item components to be displayed by using keywords input by the user such as a vendor name, or a category (analog I/O, digital I/O, encoder, or sensor).

For example, in the display aspect to improve listing performance, only the icon component 533 is employed as the device component 531 given as the item component 53, omitting the line components 534, 535, and 536. In this case, if operations (movements of a focus frame through mouse clicking or cursor key operations) are performed by the user to select the item component 53 on the device list display screen 51, texts indicating detailed information of the rich device components 531 including the line components 534, 535, and 536 and the selected slave device may be displayed in another window or display region.

The topology display screen 52 is used to display the topology of a network system under design. On the topology display screen 52, one of the device components representing the slave devices of the network system under design and one of the port components representing the ports of the slave devices of the network system under design are each disposed in each row. Each of the rows has two columns. If the component disposed in each row is a device component representing the slave device, the left side column 54 displays the node address of this slave device. The right side column 55 displays texts that indicate identification information (names, model numbers, etc.) of the device components, port components, line components interconnecting them, and slave devices.

On the topology display screen 52, with respect to the device component representing a certain slave device, the device component representing the parent slave device (slave device connected to an inport) of this slave device is disposed in an upper row and the device component representing the child slave device (slave device connected to an outport or a branching port) of this slave device is disposed in a lower row. In the highest row, the device component representing the master device is displayed. On the topology display screen 52 generated by the design assistance system of the present embodiment, a parent-child relationship of the slave device is indicated by a difference in row in which the device component is disposed, so that the user can easily know the parent-child relationship of the slave device in the network system under design, namely connection order.

There has been described an example indicating the slave device's parent-child relationship by disposing the device component representing the parent slave device and the device component representing the child slave device onto the vertical opposite sides in condition where the device component representing the local device is sandwiched by these device components. However, as long as the device component representing the parent slave device and the device component representing the child slave device are disposed on the opposite sides with respect to the device component representing the local device, the direction, for example, right-and-left direction is not limited in which the device components representing the parent and child slave devices are disposed with respect to the local device.

On the topology display screen 52, a group of the device components representing a plurality of the slave devices in a serial parent-child relationship forming a line topology by interconnecting the inports and the outports are disposed uniformly (in the same row) vertically. Further, the row in which the device components representing the branching devices and the device components representing the slave devices connected to the outports of these branching devices are disposed is different from the row in which the device components representing the slave devices connected to the branching ports of these branching slave devices are disposed.

For example, a slave device E001 is a branching slave device having one branching port for branching from the external bus to the internal bus.

A device component representing the branching slave device E001, a device component representing a slave device E009 which is connected to an outport (external bus) of the branching slave device E001, and device components representing slave devices E011 and E012 which are in a serial parent-child relationship with the slave device E009 are disposed in the same column (which is assumed to be the first column). Further, a device component representing a slave device E002 which is connected to the branching slave device E001 and device components representing slave devices E003, E004, and E008 which are in a serial parent-child relationship with the slave device E002 are disposed in the same column (which is assumed to be the second column). The second column is disposed as shifted to the right side of the first column. The column, referred to here, corresponds to a "hierarchy" in the invention.

On the topology display screen 52 generated by the design assistance system of the present embodiment, a group of the slave devices joining to a bus branching in the branching slave device are represented by a difference in column, so that the user can easily know the branching of the bus in the network system under design.

The topology display screen 52 displays the port components, which are GUI components representing the ports provided to the slave devices. On the topology display screen 52 generated by the design assistance system of the present embodiment, as the GUI components representing the ports, especially only the port components representing a plurality of branching ports provided to the branching slave device are displayed.

For example, the slave device E004 is a branching slave device provided with two branching ports for branching from the internal bus to the external bus, which ports are represented by displayed port components 551 and 552. By the port components 551 and 552, the user can recognize the two external bus-connected branching ports provided to the slave device E004 on the topology display screen 52. Although the port components representing the outports (connection for the internal bus) of the slave device E004 are not displayed, the device components representing the slave device E004 are, as described above, arranged to include the line components displayed in the different aspects in accordance with the different types of the connection interfaces, so that the user can recognize the outports provided to the slave device E004 by line components 553 representing the outports for internal bus connection. Further, the slave device E009 is a branching slave device provided with two branching ports for branching from the external bus to the internal bus, the branching ports being represented by displayed port components 561 and 562. Further, an external-connection outport is represented by a line component 560.

The topology display screen 52 displays GUI components that indicate identification information of the branching ports in addition to the port components. The identification information may be, for example, names of the ports. In the example of the slave device E009, in addition to the port component 561, a label component 563 is displayed that indicates "X1", which is the name of a branching port represented by this port component. Further, in addition to the port component 562, a label component 564 is displayed that indicates "X2", which is the name of a branching port represented by this port component. Accordingly, the user can identify the two branching ports of the slave device E009 by name on the topology display screen 52.

In the case of the branching slave device not provided with a plurality of the branching ports as in the case of the slave device E001, no port components are displayed which are used as independent GUI components for the purpose of representing the branching ports. However, as described above, the ports and the connection interfaces provided to the slave device are represented by line components included in the device component, so that even if no port components are displayed, the user can identify the inports, outports, and branching ports on the topology display screen 52.

On the topology display screen 52 generated by the design assistance system of the present embodiment, in addition to a device component representing a branching slave device provided with a plurality of branching ports, port components independent of the device component representing the branching ports are displayed, so that the user can clearly identify the ports to which the slave device is to be connected, in design of a network system.

For example, the design assistance system of the present embodiment is well suited for design of an EtherCAT network system; however, the EtherCAT changes order in which frames transmitted from the master device are processed, depending on which port of the branching slave device the slave device is to be connected to. In a case where a network is designed to perform inter-slave communication in a concept by which results of processing by a slave device on the upstream side are used by a slave device on the downstream side, the order in which the slave devices process the frames is especially important. If a branching port of the real machine of a branching slave device describes identification information equivalent to that which can be acquired from slave information data, when assembling an actual network, the user can connect the slave devices as intended in design, avoiding making a mistake of selecting a wrong connection-destination port.

Only if a branching slave device is provided with a plurality of branching ports, the port components representing those branching ports are to be displayed on the topology display screen 52 of the present embodiment. However, some or all of the inports, outports, branching ports of each of the slave devices may be displayed.

On the topology display screen 52, the topology of a network system under design is indicated by connecting the device components and the port components by using line components representing interconnection between the ports provided to the slave devices. The color or the line type of the line components represents the type of the port connection interface. As described above, in the present embodiment, it is assumed that the line component indicated by a bold line represents interconnection between the ports for connection to the external bus and the line component indicated by a thin line represents interconnection between the ports for connection to the internal bus. The device component representing a branching slave device and the port component representing a branching port provided to this branching device are also connected using a similar line component. That is, on the topology display screen 52, interconnection between the ports provided to the slave device and connection to the branching port inside a branching slave device are represented by the similar line component.

By the topology display screen 52 configured by connecting the device components and the port components with the line components, the user can easily know the topology of the network system. In particular, it is possible to clearly identify which port of a branching slave device causes bus branching, well suitably assisting design of a network taking into consideration the order in which the slave devices process data.

The design assistance GUI described above is generated by the generation section 34 based on information of the slave devices which is acquired from the acquisition section 32. The acquisition section 32 acquires unique information of the slave devices (vendor name, model number, the number of ports, port connection interface, port name, etc.) from the slave information data stored in the storage section 31 and transmits the unique information to the generation section 34. The slave information data may contain image data that can be used as the icon component 533 of the device component 531. Based on the unique information of the slave devices received from the acquisition section 32, the generation section 34 generates device components representing the slave devices, line components for representing ports composing the device components, line components representing interconnection between the slave devices composing a network system, port components representing branching ports provided to a branching slave device, etc.

Figure 4:
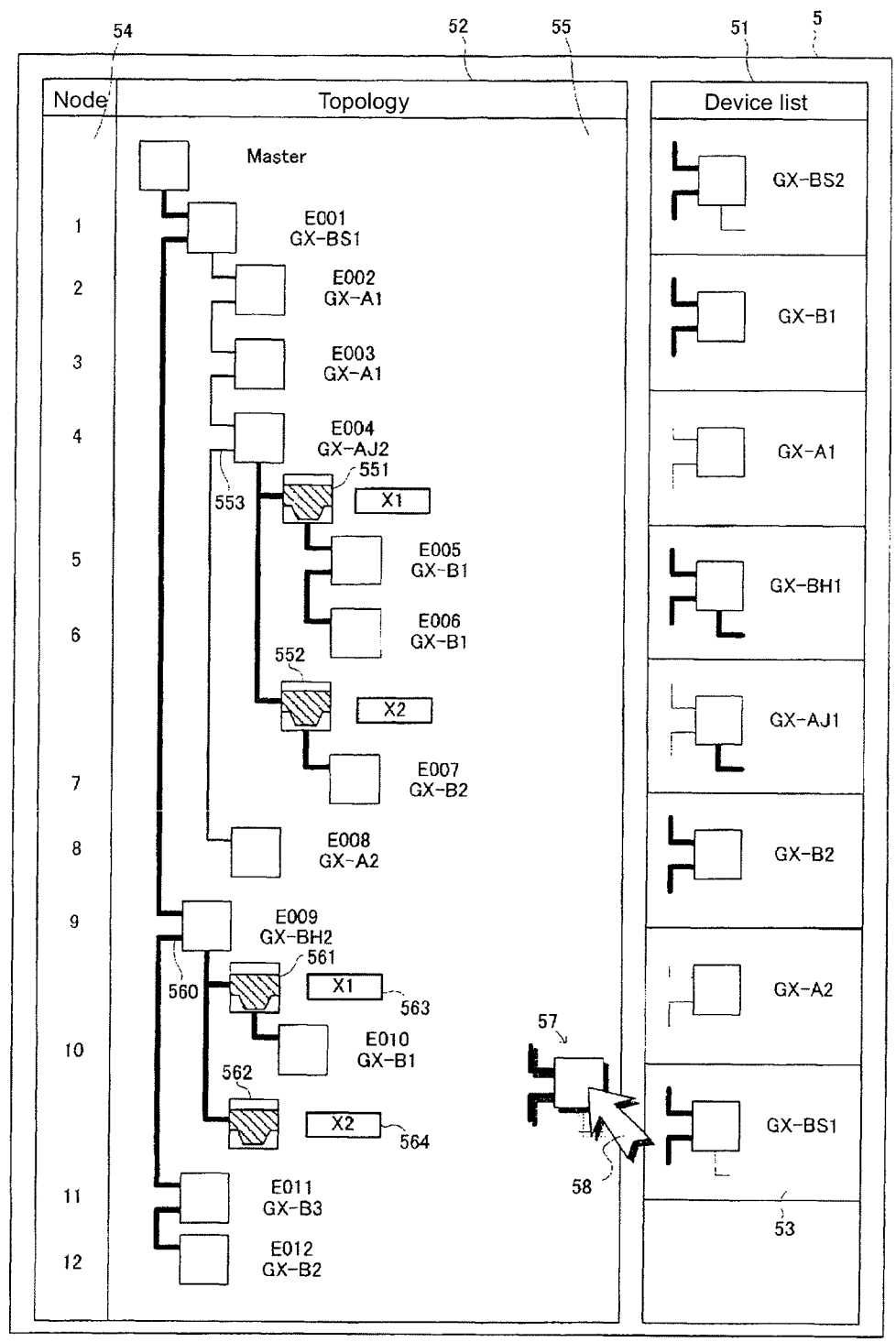
FIG. 4 is a view showing a display example of the GUI in a case where a device component is dropped by a user from a device list screen to a topology display screen in the design assistance system according to the embodiment.

In a GUI generated by the design assistance system of the present embodiment, the user can add a slave device to or delete it from a network system under design by performing drag-and-drop operations on the device components in a direction from the device list display screen 51 to the topology display screen 52 or in the opposite direction. In FIG. 4, a to-be-added device component 57 represents a device component being dragged by the user from the device list display screen 51 to the topology display screen 52. The to-be-added device 57 being dragged is indicated by a following pointer 58 that moves as the user operates the mouse.

The to-be-added device component 57 being dragged is provided with line components which are shown to represent ports, as shown in the FIG. 4. Accordingly, the user can easily know the number of the ports and the connection interfaces provided to the slave device (referred to as to-be-added slave device) which is represented by the to-be-added device component 57 being dragged. The GUI well suitably assists the user when the user drops the device component to an appropriate position (where a device component or a port component is displayed which respectively represents a slave device or a port to which the to-be-added slave device can be connected) on the topology display screen 52.

Figure 5:
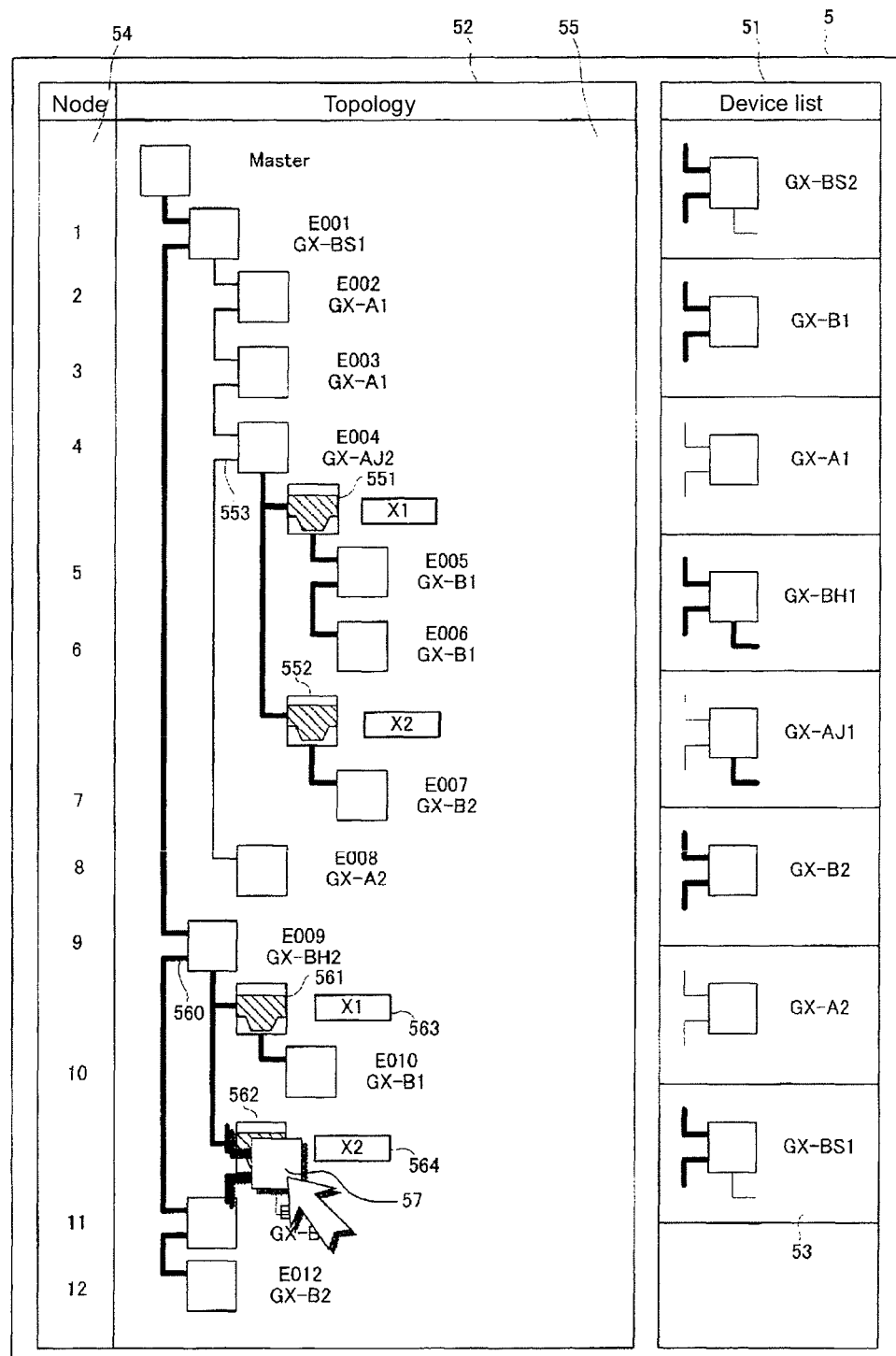
FIG. 5 is a view showing a display example of the GUI in a case where the device component is dropped by the user on a port component on the topology display screen in the design assistance system according to the embodiment.
Figure 6:
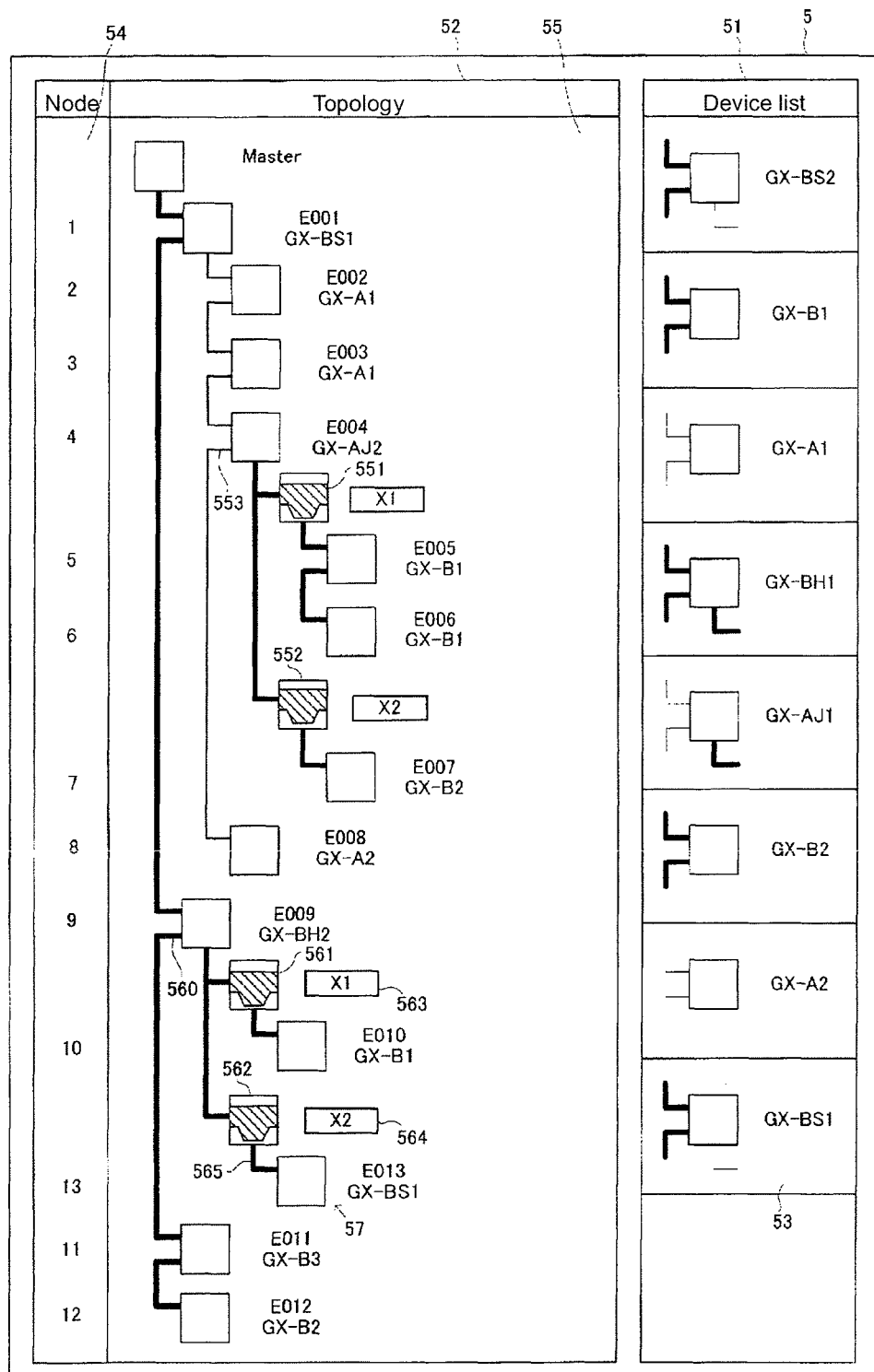
FIG. 6 is a view showing a display example of the topology display screen in which a drop-destination port component is connected to a dropped component generated in a case where a device component is dropped by the user to a port component on the topology display screen in the design assistance system according to the embodiment.

If operations to drag the to-be-added device component 57 and drop it to a port component displayed on the topology display screen 52 are performed by the user, the design assistance system generates a topology display screen 52 indicating that a port represented by the drop-destination port component and an inport of the to-be-added slave device are connected to each other. For example, FIG. 5 shows a display example of the GUI in a case where the to-be-added device component 57 is dropped by the user to the port component 562. In this case, the design assistance system generates a topology display screen 52 indicating that the second branching port X2 of the slave device E009 represented by the port component 562 is connected to the inport of the to-be-added slave device by connecting the to-be-added device component 57 and the port component 562 to each other with a line component 565 compatible with the port connection interface, as shown in FIG. 6.

Figure 7:
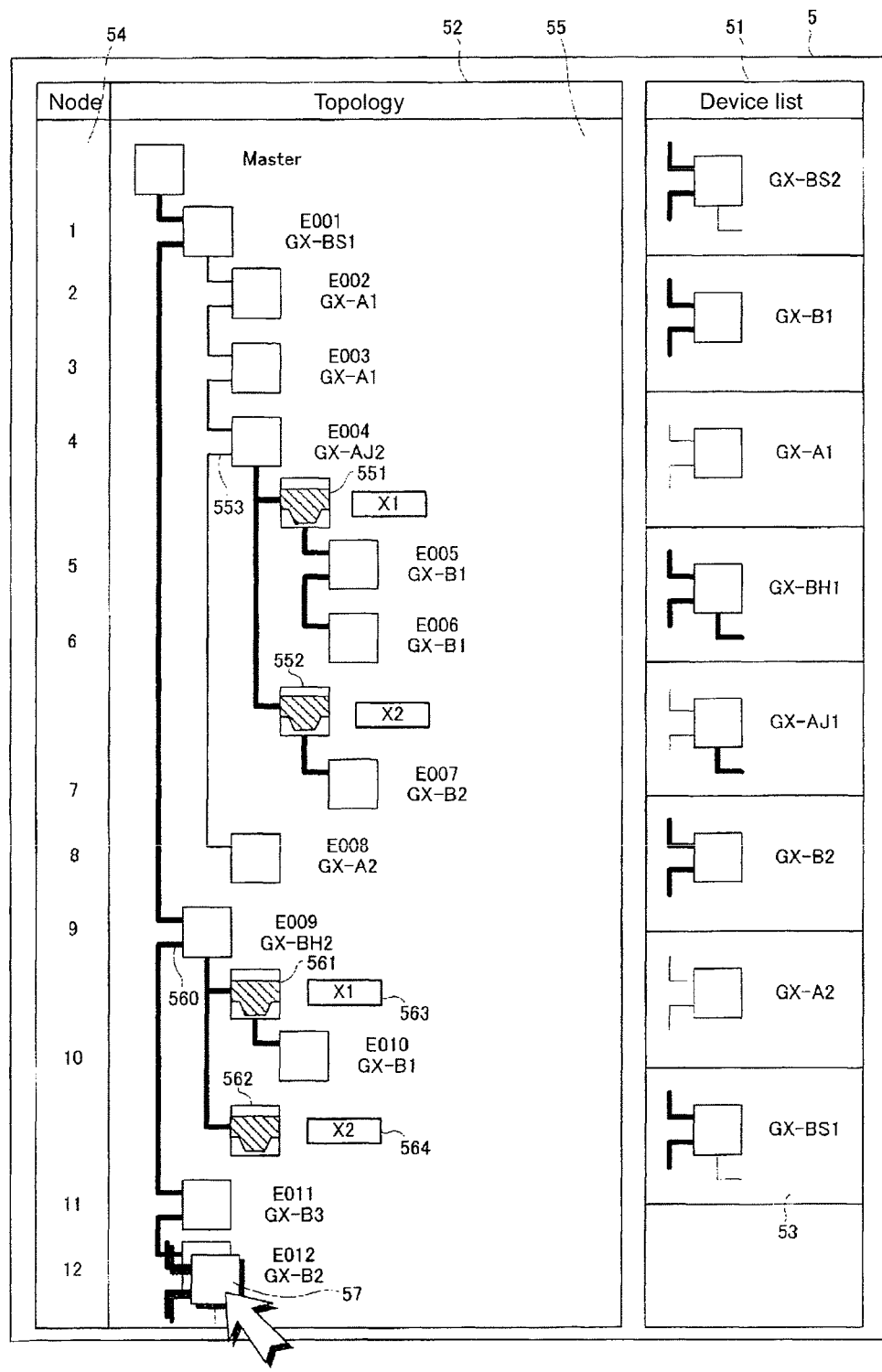
FIG. 7 is a view showing a display example of the GUI in a case where a device component is dropped by the user to a device component on the topology display screen in the design assistance system of the embodiment.
Figure 8:
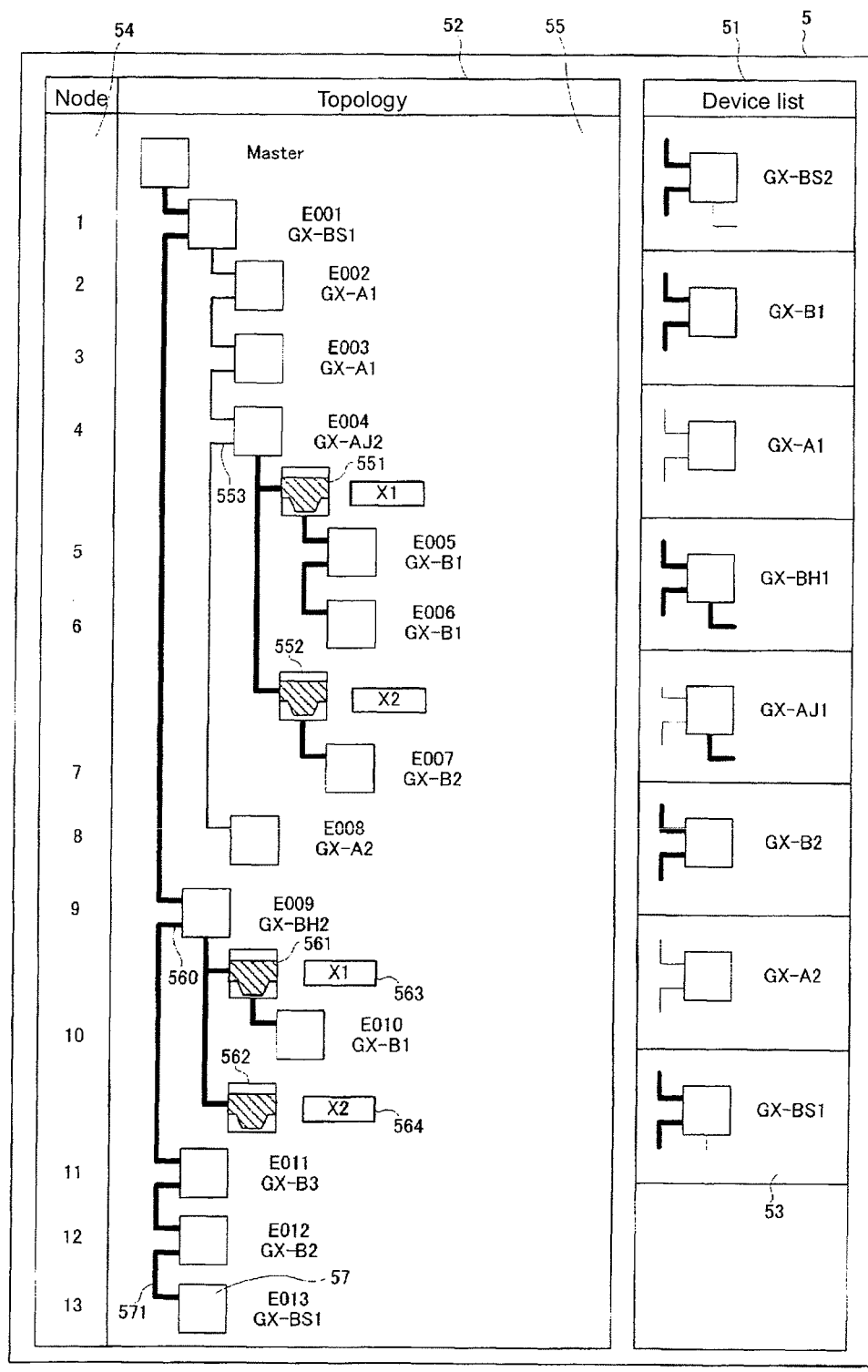
FIG. 8 is a view showing a display example of the topology display screen on which a drop-destination device component is connected to a dropped device component generated when the device component is dropped by the user to the device component on the topology display screen in the design assistance system of the embodiment.

If operations to drag the to-be-added device component 57 and drop it to a device component displayed on the topology display screen 52 are performed by the user, the design assistance system decides whether a slave device (referred to as connection-destination slave device) represented by the drop-destination device component has a plurality of ports to which the to-be-added slave device can be connected and, if having decided that the slave device has one such port, generates a topology display screen 52 indicating that an outport of the connection-destination slave device is connected to an inport of the to-be-added slave device. For example, FIG. 7 shows a display example of the GUI in a case where the to-be-added device component 57 is dropped by the user to the device component E012. In this example, the to-be-added slave device is provided with an external bus-connection inport and the slave device E012 is provided with one outport for external bus connection, so that it is decided that the connection-destination slave device has one port to which the to-be-added slave device can be connected. In this case, the design assistance system generates a topology display screen 52 indicating that the outport of the connection-destination slave device E012 is connected to the inport of the to-be-added slave device by connecting the device component E012 and the to-be-added device component 57 to each other with a line component 571 compatible with the connection interface, as shown in FIG. 8.

Figure 9:
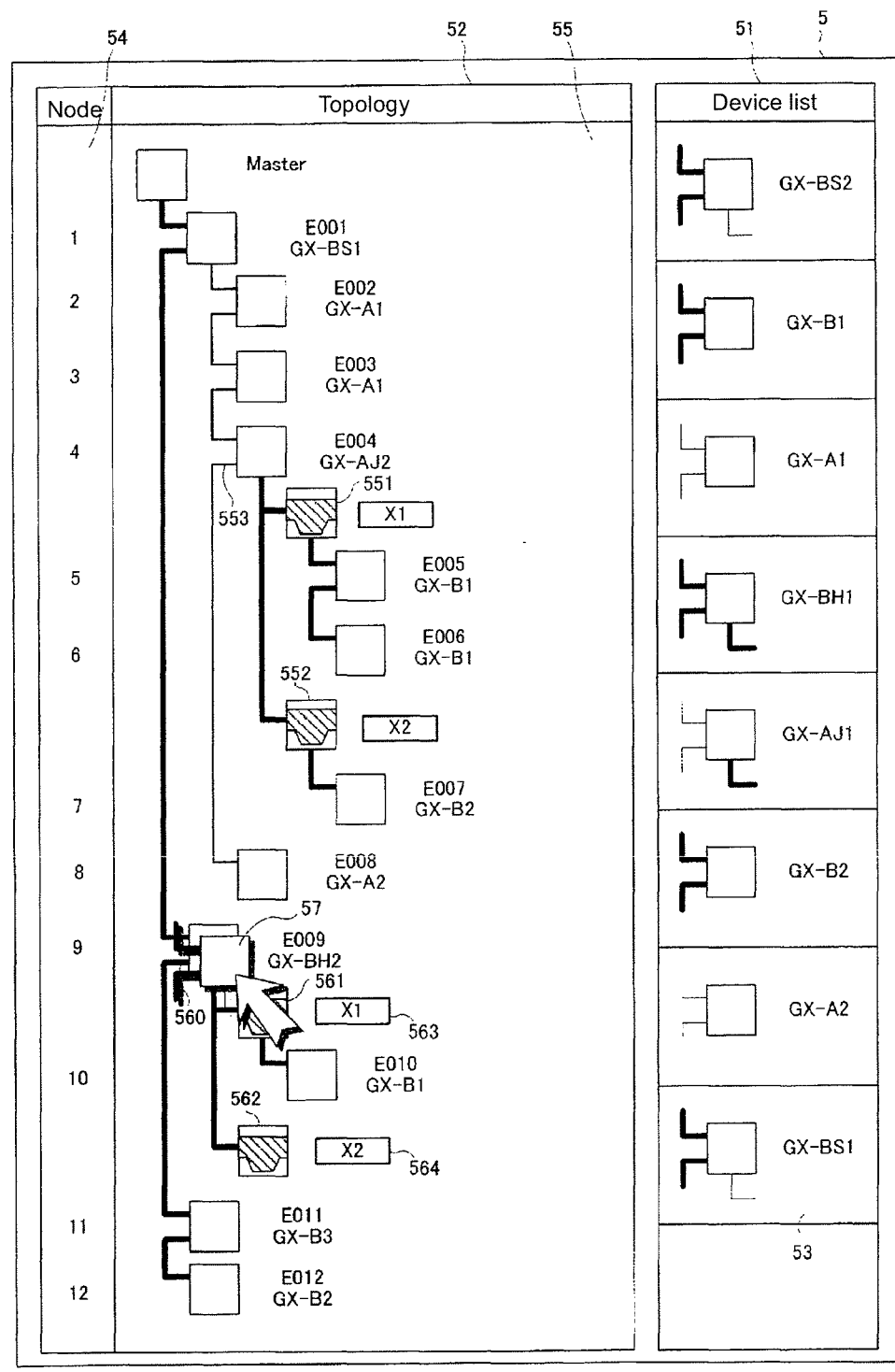
FIG. 9 is a view showing the GUI in a case where a device component is dropped by the user to a device component provided with a plurality of connectable ports on the topology display screen in the design assistance system of the embodiment.
Figure 10:
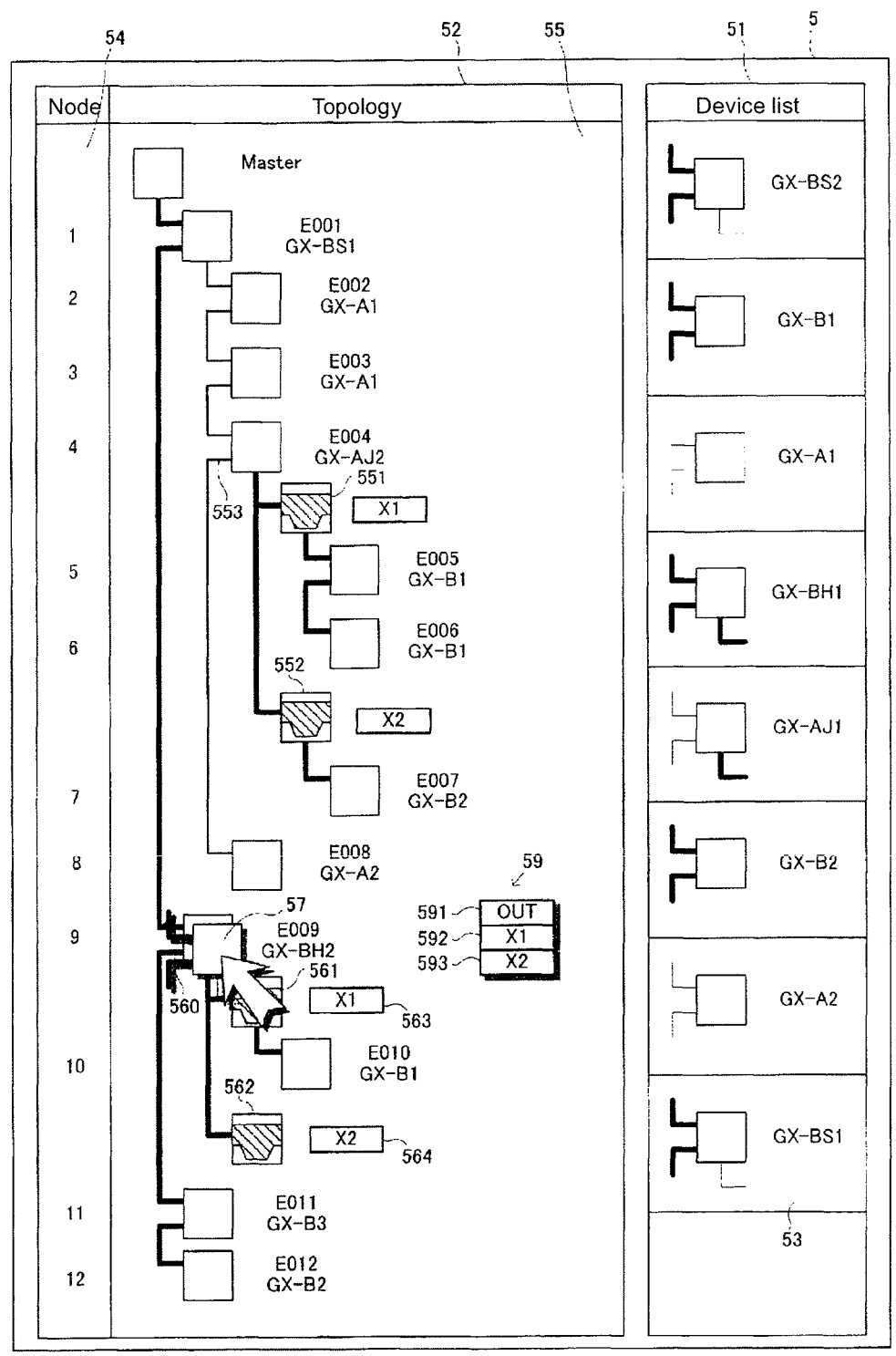
FIG. 10 is a view showing a display example of port list components representing a list of connectable ports generated in a case where a device component is dropped by the user to a device component provided with a plurality of connectable ports on the topology display screen in the design assistance system of the embodiment.

If it is decided that the connection-destination slave device has a plurality of ports to which the to-be-added slave device can be connected, the design assistance system generates item components, each of which is the GUI component indicating identification information of each of those connection ports, and also generates a port list component, which is a list of the item components, and then provides pop-up display of them near the drop-destination device component. For example, FIG. 9 shows the GUI in a case where the device component 57 is dropped by the user to the to-be-added device component E009. In this example, the to-be-added slave device is provided with an external bus-connection inport and the slave device E009 is provided with one outport for external bus connection and two branching ports for external bus connection, so that it is decided that the connection-destination slave device has three ports to which the to-be-added slave device can be connected. In this case, the design assistance system generates an item component 591 representing "OUT", which is identification information of the outport provided to the slave device E009, an item component 592 indicating "X1", which is identification information of the first branching port, and an item component 593 indicating "X2", which is identification information of the second branching port, and also generates a port list component 59, which is a list of the item components, and then provides pop-up display of them near the drop-destination device component E009, as shown in FIG. 10.

Figure 11:
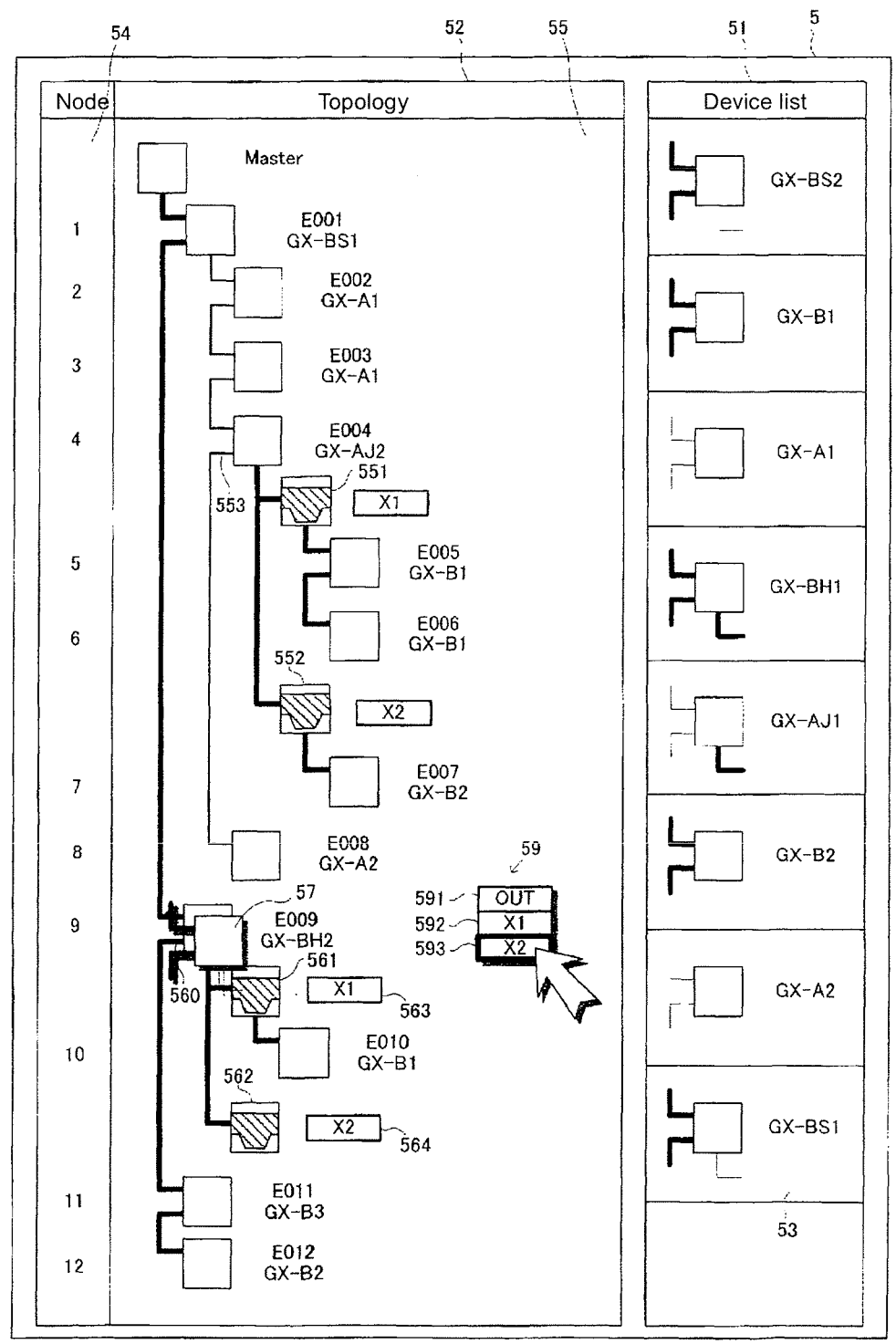
FIG. 11 is a view showing a display example of the GUI in a case where one of item components enumerated as the port list components is selected by the user in the design assistance system of the embodiment.
Figure 12:
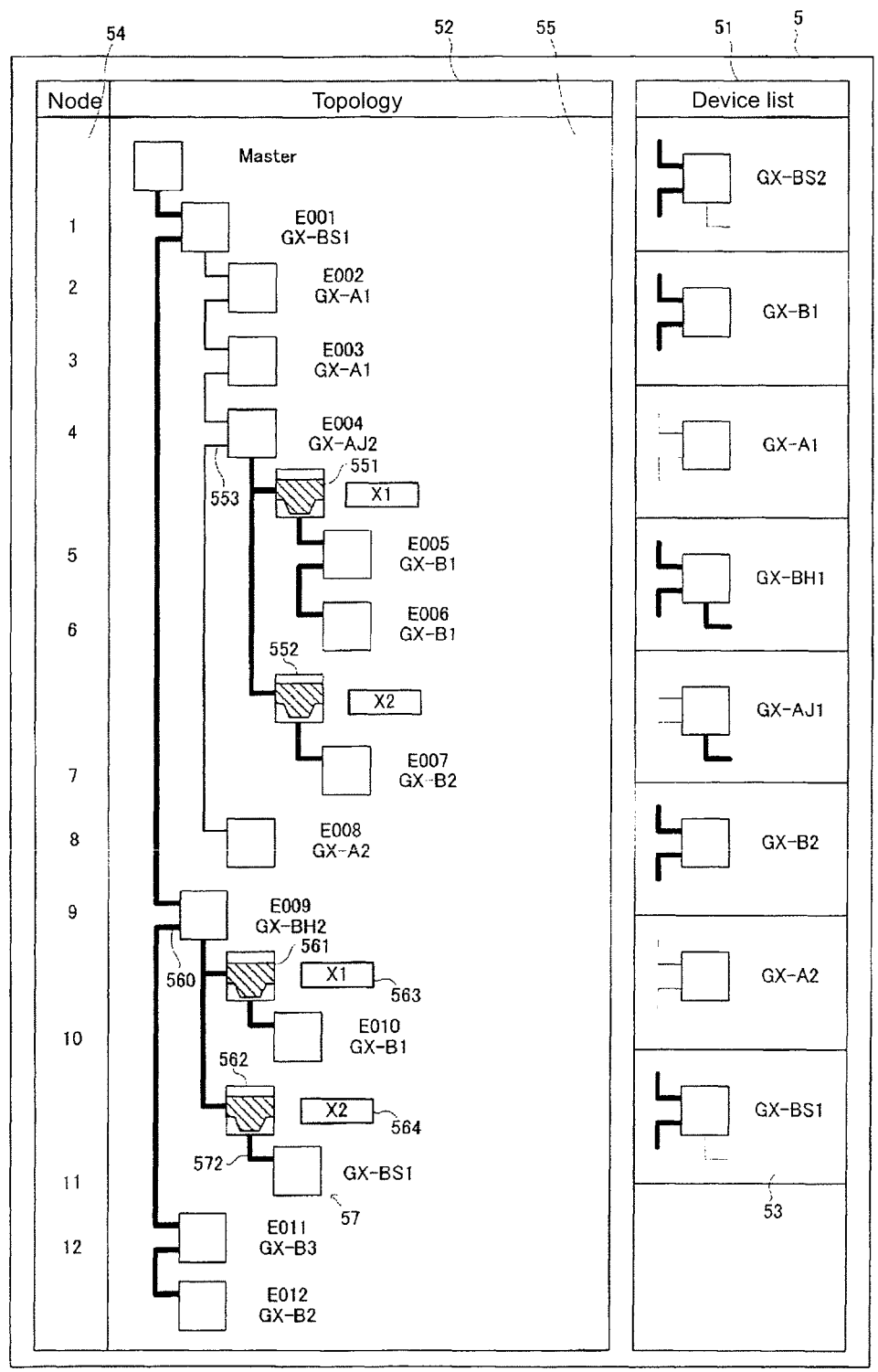
FIG. 12 is a view showing a display example of the topology display screen on which a port component selected from the port list and a dropped component generated in a case where one of the item components enumerated as the port list components is selected by the user in the design assistance system of the embodiment.

If operations to select any one of the item components composing the port list component are performed by the user, the design assistance system generates a topology display screen 52 indicating that the inport of the to-be-added slave device is connected to a port represented by the item component selected by the user among the ports provided to a connection-destination slave device. For example, FIG. 11 shows a display example of the GUI in a case where operations to select the item component 593 of the port list component 59 are performed by the user. In this case, the design assistance system generates a topology display screen 52 indicating that the branching port X2 of the connection-destination slave device E009 is connected to the inport of the to-be-added slave device by connecting the to-be-added device component 57 and the port component 562 representing the branching port X2 represented by the item component 593 with each other with a line component 572 compatible with the connection interface, as shown in FIG. 12.

If the to-be-added device component is dropped by the user to the device component or port component to which a slave device is already connected on the topology display screen 52, the design assistance system generates a topology display screen 52 indicating that the to-be-added slave device represented by the dropped device component is connected in a manner such that the to-be-added slave device may be sandwiched by the connection-destination slave device (connection-destination port) represented by the drop-destination device component (or port component) and the slave device already connected to this connection-destination slave device (connection-destination port).

Figure 13:
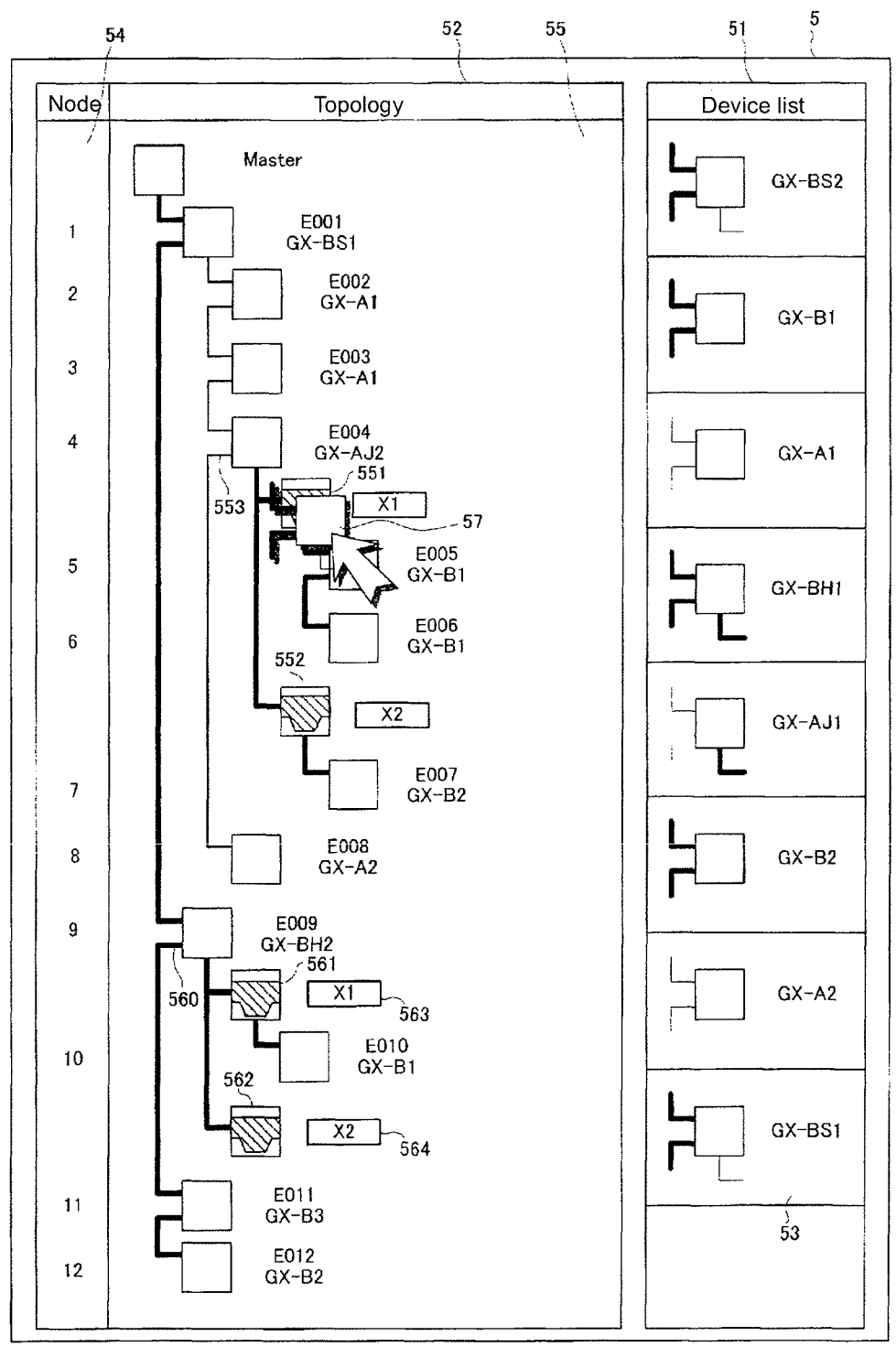
FIG. 13 is a view showing a display example of the GUI in a case where a device component is dropped by the user to a port component to which a device component is already connected on the topology display screen in the design assistance system of the embodiment.
Figure 14:
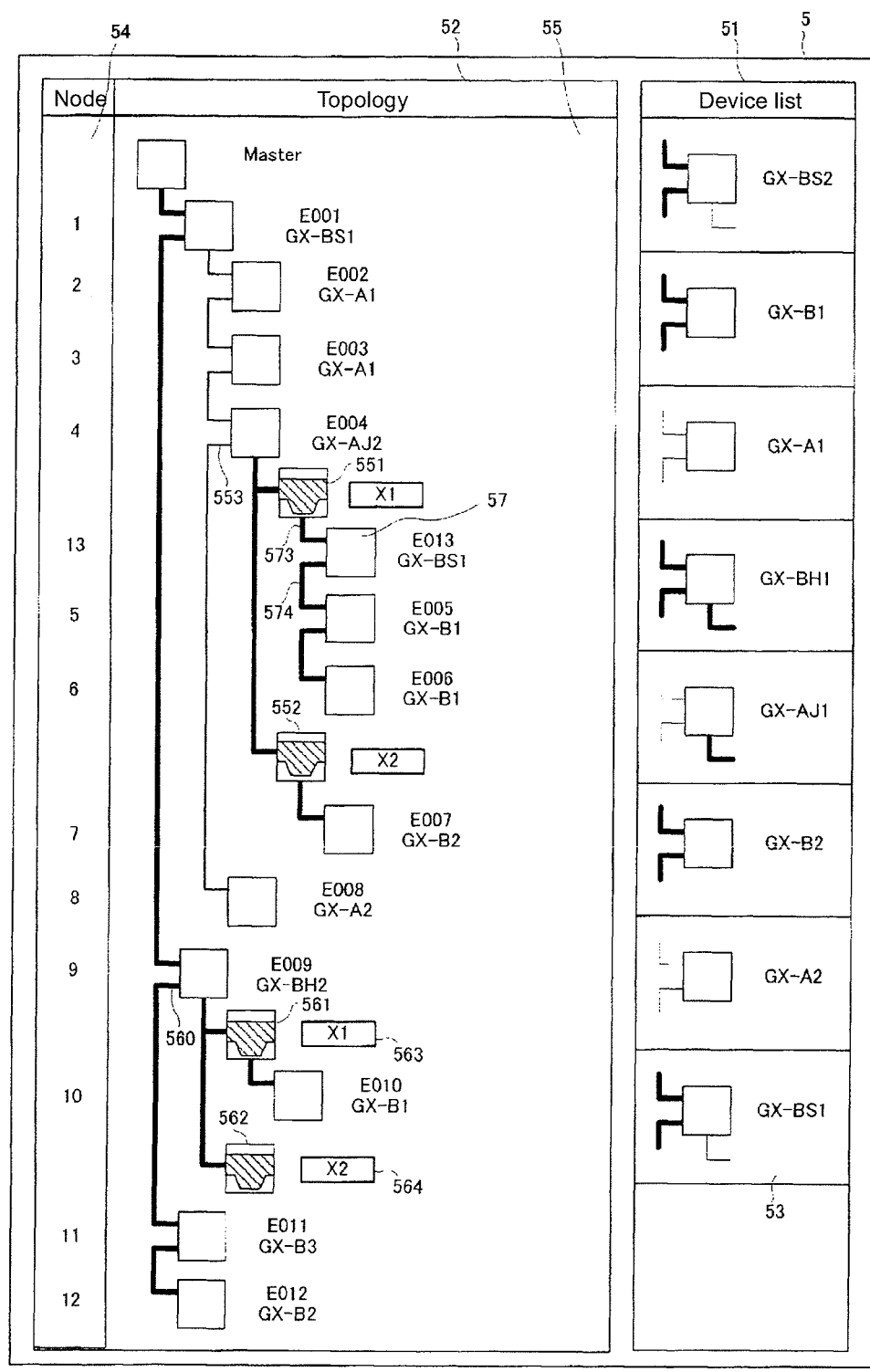
FIG. 14 is a view showing a display example of the topology display screen on which a dropped device component generated in a case where a device component is dropped by the user to a port component to which a device component is already connected on the topology display screen is connected in a manner such that the dropped device component may be sandwiched by a drop-destination component and a device component initially connected to this port component in the design assistance system of the embodiment.

FIG. 13 shows a display example of the GUI in a case where the to-be-added device component 57 is dropped by the user to the port component 551. In this example, since the device component E005 is already connected to the port component 551, the design assistance system disposes the port component 551 in a row immediately below the port component 551 to interconnect them with a line component 573 and also disposes the device component E005 in a row immediately below the to-be-added device component 57 to interconnect the device component E005 and the to-be-added device component 57 with a line component 574, as shown in FIG. 14. In such a manner, the design assistance system generates the topology display screen 52 indicating that a first branching port X1 of the slave device E004 represented by the port component 551 is connected to the inport of the added slave device and the outport of the added slave device is connected to an inport of the slave device E005.

Figure 15:
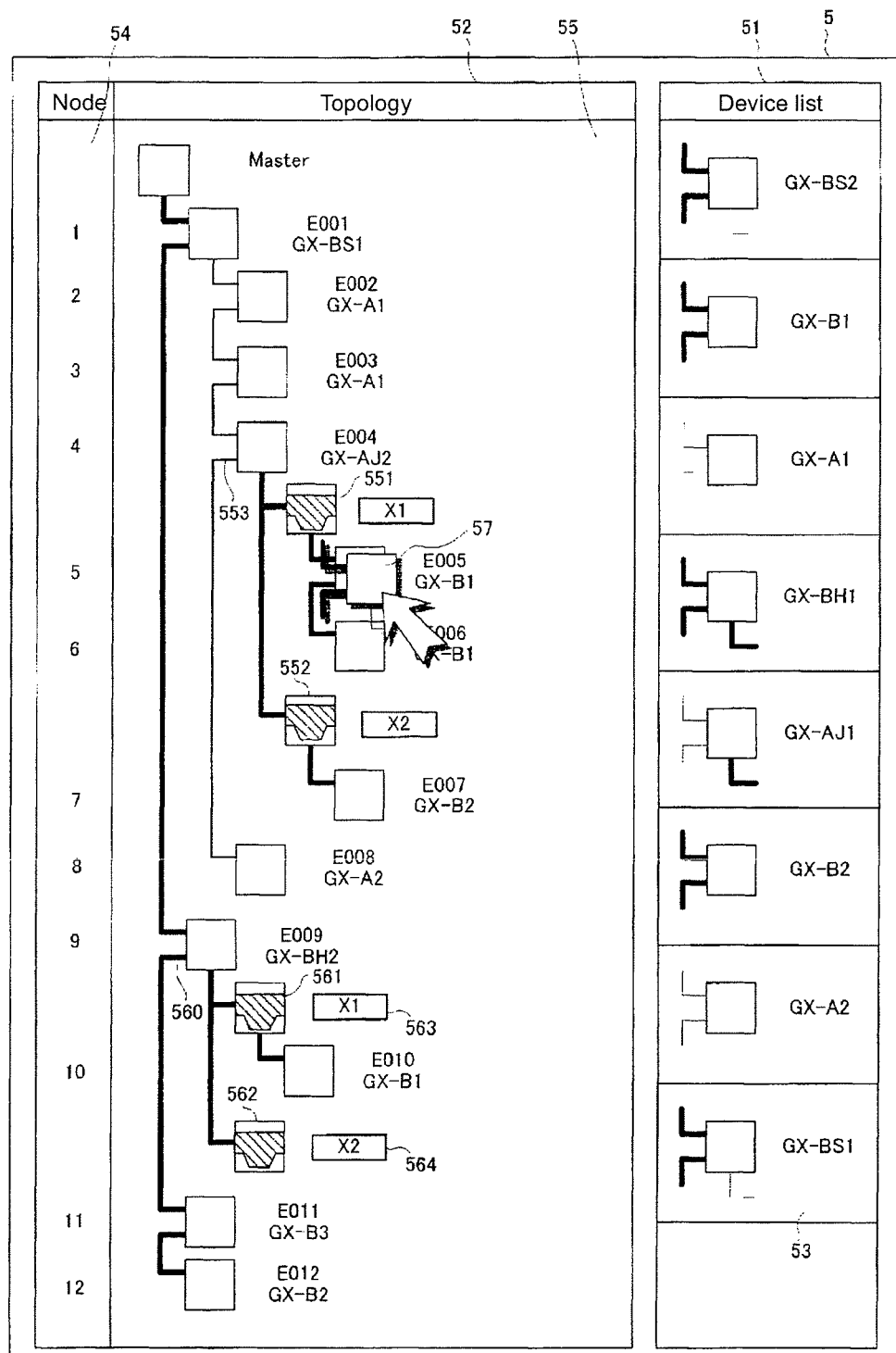
FIG. 15 is a view showing a display example of the GUI in a case where a device component is dropped by the user to a device component to which a device component is already connected on the topology display screen in the design assistance system of the embodiment.
Figure 16:
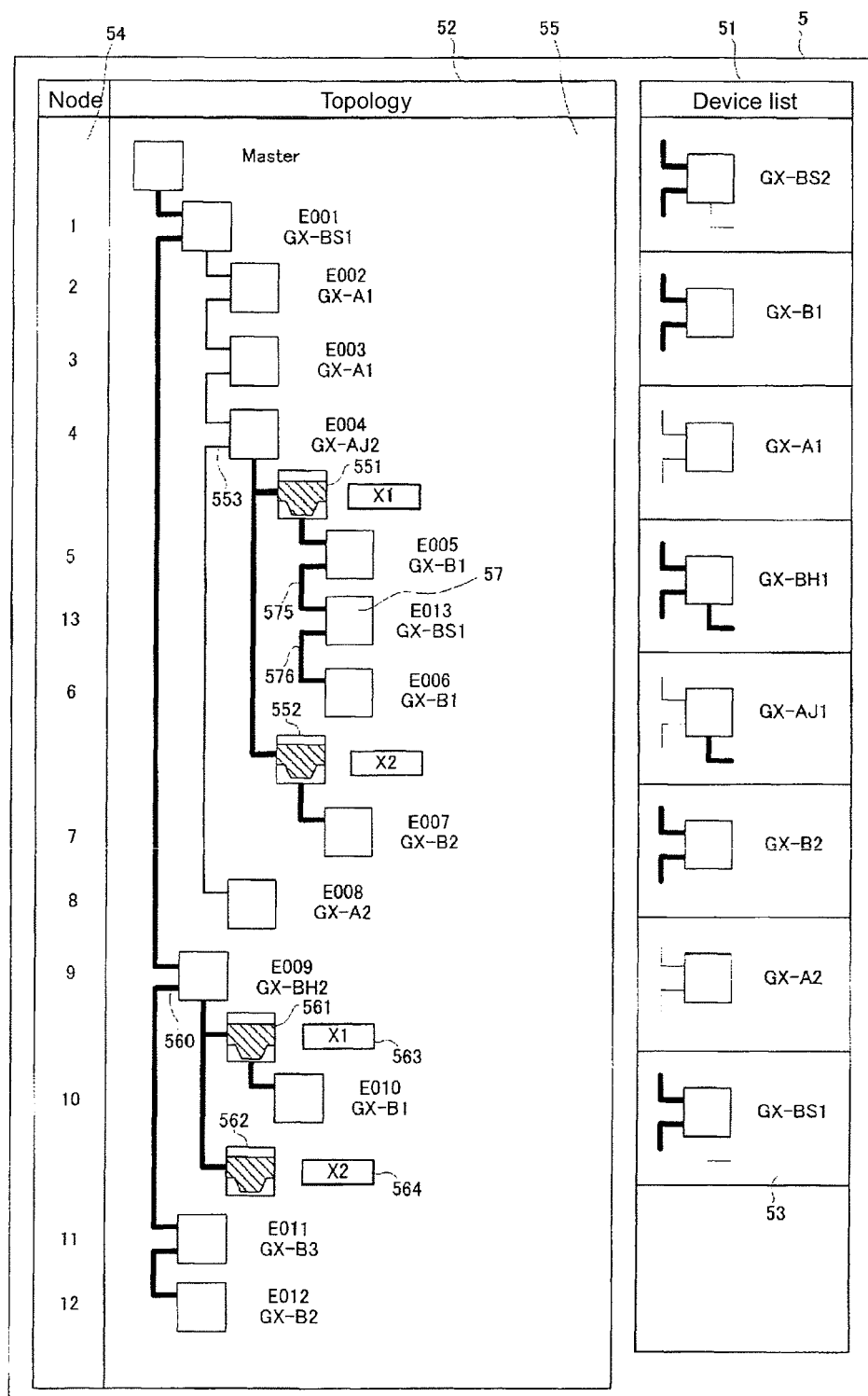
FIG. 16 is a view showing a display example of the topology display screen on which a dropped component generated in a case where a device component is dropped by the user to a device component to which a device component is already connected on the topology display screen is connected in a manner such that the dropped device component may be sandwiched by a drop-destination device component and a device component initially connected to this device component.

FIG. 15 shows a display example of the GUI in a case where the to-be-added device component 57 is dropped by the user to the device component E005. In this example, since the device component E006 is already connected to the device component E005, the design assistance system disposes the to-be-added component 57 in a row immediately below the device component E005 to interconnect the to-be-added device component 57 and the device component E005 with a line component 575 and also disposes the device component E006 in a row immediately below the to-be-added device component 57 to interconnect the device component E006 and the to-be-added device component 57 with a line component 576, as shown in FIG. 16. In such a manner, the design assistance system generates the topology display screen 52 indicating that the outport of the slave device E005 is connected to the inport of the added slave device and the outport of the added slave device is connected to the inport of the slave device E006.

Such control on the GUI in the case where the user adds a slave device to a network system under design is conducted by the generation section 34 based on a signal which is input by the input section 33 and indicates user operations and information of the slave device acquired from the acquisition section 32. In response to a request from the generation section 34, the acquisition section 32 acquires the information of a vendor name, a model number, the number of ports, connection interfaces of the ports, and names of the ports of the slave device from the slave information data stored in the storage section 31 and transmits the information to the generation section 34. Based on the unique information of the slave device received from the acquisition section 32, the generation section 34 generates the to-be-added device component being dragged, the port list component, and the line component interconnecting the post-drop connection-destination device component and the to-be-added device.

Figure 17:
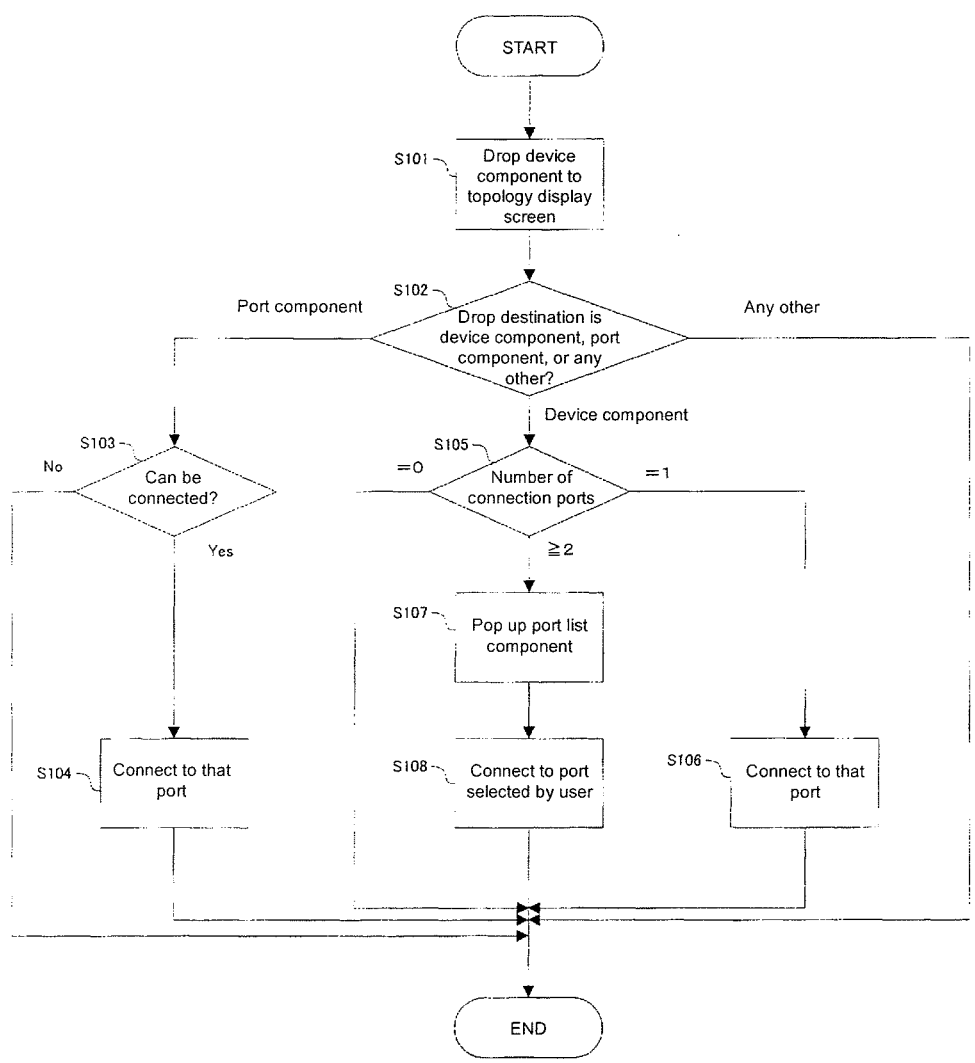
FIG. 17 is a flowchart showing processing which is performed in a case where a device component is dragged, by the user, from the device list display screen and dropped to the topology display screen in the design assistance system of the embodiment.
Figure 18:
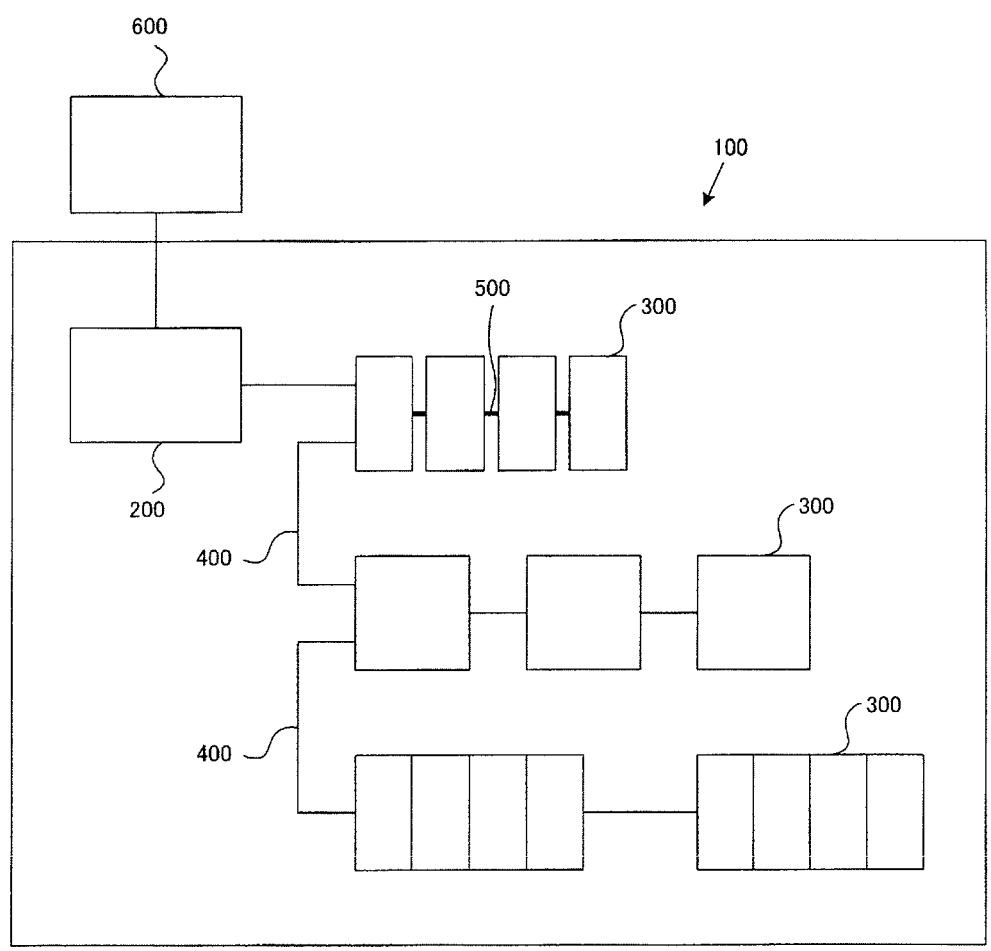
FIG. 18 is a diagram showing a configuration example of a typical field network.

FIG. 17 is a flowchart showing processing which is performed in a case where a device component is dragged, by the user, from the device list display screen 51 and dropped to the topology display screen 52 in the design assistance system of the present embodiment.

If information about operations performed by the user in step S101 to drag and drop a device component from the device list display screen 51 to the topology display screen 52 is input from the input section 33, the generation section 34 decides in step S102 whether a drop-destination GUI is a device component, a port component, or any other than them. If the drop destination is neither a device component or a port component, the generation section 34 ends the processing.

If the drop destination is a port component, the generation section 34 advances to step S103 to decide whether a slave device (to-be-added slave device) represented by the dragged device component can be connected to a port (drop-destination port) represented by the drop-destination port component. The decision is made by the generation section 34, which acquires information of the type of the connection interface of a port provided to the to-be-added slave device and information of the connection interface of the drop-destination port from the acquisition section 32 and compares these pieces of information. The acquisition section 32 acquires slave information data of the to-be-added slave device and slave information data of the slave device provided with the drop-destination port from the storage section 31 and acquires the information of the types of the connection interfaces of the ports provided to the respective slave devices from the slave information data and then transmits the acquired information to the generation section 34.

If the drop-destination port is a port not capable of connecting with the to-be-added slave device, the generation section 34 ends the processing. This is the case where the drop-destination port is an internal bus-connection port and the to-be-added slave device is an external bus-connection slave device or the case where the drop-destination port is an external bus-connection port and the to-be-added slave device is an internal bus-connection slave device.

If the drop-destination port is a port capabe of connecting with the to-be-added slave device, the generation section 34 advances to step S104 to determine the drop-destination port as a port to which the to-be-added slave device is to be connected. Then, the generation section 34 generates a topology display screen on which the device component dragged from the device list display screen 51 and the drop-destination port component are connected to each other with a line component and outputs the topology display screen to the image output section 35.

If it is decided in step S102 that the drop-destination is a device component, the generation section 34 advances to step S105 to decide whether how many ports to which the to-be-added slave device can be connected are provided to a slave device (drop-destination slave device) represented by the drop-destination device component. The decision is made by the generation section 34, which acquires information of the type of the connection interface of a port provided to the to-be-added slave device and information of the number of the ports and the type of the connection interface provided to the drop-destination port from the acquisition section 32 and compares these pieces of information. The acquisition section 32 acquires slave information data of the to-be-added slave device and slave information data of the drop-destination slave device from the storage section 31 and acquires the information of the number of the ports and the types of the connection interfaces of the ports provided to the respective slave devices from the slave information data and then transmits the information to the generation section 34.

If the drop-destination slave device is not provided with a port to which the to-be-added slave device can be connected, the generation section 34 ends the processing. This is the case where the internal bus-connection slave device is dropped to an external bus-connection slave device or the case where the external bus-connection slave device is dropped to an internal bus-connection slave device.

If the drop-destination slave device has one port to which the to-be-added slave device can be connected, the generation section 34 advances to step S106 to determine the one connection port as a connection-destination port of the to-be-added slave device. Then, the generation section 34 generates a topology display screen on which the device component dragged from the device list display screen 51 and the drop-destination device component are connected to each other with a line component and outputs the topology display screen to the image output section 35.

If the drop-destination slave device is provided with at least two ports to which the to-be-added slave device can be connected, the generation section 34 advances to step S107 to generate a port list indicating the multiple connection ports. Then, in step S108, a port selected by the user from among the port list components is determined as a port to which the to-be-added slave device is to be connected. Then, the generation section 34 generates a topology display screen on which the device component dragged from the device list display screen 51 and the port component representing the port determined as the connection-destination port are connected to each other with a line component and outputs the topology display screen to the image output section 35.

By the design assistance system of the present embodiment, the GUI component representing a branching port of the branching slave device having a plurality of branching ports and the GUI component for identifying each of the branching ports are clearly expressed on the topology display screen, so that the user drops a device component to a GUI component representing the port, to connect the port and the slave device to each other in network design. Therefore, by the design assistance system of the present embodiment, the user can design a network system, clearly taking into consideration the ports. Thus, even the user having no expert knowledge can easily design a network system such as an EtherCAT in which ports to which the slave device is connected have an influence on the formation of a frame circuit.

In such a manner, a design assistance system of the invention for assisting design of a network system in which at least one slave device joins to a communication bus drawing a line, tree, or star topology from a master device as a starting point, the network system being formed by interconnecting ports of each of the master and slave devices, includes: a display which displays a design assistance GUI; a control device configured to control the GUI which is displayed on the display; and an input device configured to permit a user to input a command configured to operate the GUI, in which the control device includes: storage section configured to store slave information data in which unique information of the slave device is described; acquisition section configured to acquire information of the port of the slave device from the slave information data; and generation section configured to generate a port component serving as a GUI component representing the port of the slave device, based on the information of the port, generate a device component serving as a GUI component representing the slave device, based on the slave information data, and generate a design assistance GUI containing a topology display screen which displays a topology of the network system, under design, which includes the device component and the port component.

In the design assistance system of the invention, it may be acceptable that the acquisition section acquires information which identifies an inport serving as a port to which a slave device serving as a parent on a communication bus is connected, an outport serving as a port to which a slave device serving as a child on the communication bus is connected, and a branching port serving as a port at which the communication bus branches off; and the generation section makes mutually different in a right-and-left direction a hierarchy in which a device comnponent representing the child slave device is disposed below a device component representing the parent slave device and the device component representing a branching slave device, which is a slave device having a branching port, and the device component representing a slave device which is connected to the outport of this branching slave device are disposed and a hierarchy in which the device component representing the slave device which is connected to the branching port of the branching slave device is disposed, on a topology display screen.

In this configuration, the user can easily know the parent-child relationship, namely the connection order of the slave devices on the topology display screen. Moreover, the user can easily distinguish between the communication bus and buses branching off from the communication bus. Therefore, the user can easily design a network system having a complicated topology.

In the design assistance system of the invention, it may be acceptable that the generation section generates a device list display screen displaying a list of device components representing slave devices which can be newly joined to a network system under design and also generates a design assistance GUI containing a topology display screen and the device list display screen, in which if operations to drag any one of the device components enumerated on the device list display screen and drop the dragged component to any one of port components composing the topology display screen are performed by the user, the generation section generates the topology display screen indicating that a slave device represented by the dragged device component is connected to a port represented by the drop-destination port component.

In the configuration, the user can design a network system by performing simple and intuitive operations to drag and drop a device component from a device list display screen to a topology display screen. In particular, since port components representing ports provided to slave devices are displayed on the topology display screen in the design assistance system of the invention, when performing operations to join a new slave device to a network system under design, the user can design the network system, taking into consideration to which port the slave device should join in order to cause the network system to perform desired operations. Moreover, by performing simple operations to drop the device component at the port component representing a desired port, it is possible to design a network system in which the slave device is jointed to the desired port. Therefore, the user can easily design the network system.

In the design assistance system of the invention, it may be acceptable that the generation section generates a device list display screen displaying a list of device components representing slave devices which can be newly joined to a network system under design and also generates a design assistance GUI containing a topology display screen and the device list display screen, in which if operations to drag any one of the device components enumerated on the device list display screen and drop it to any one of the device components composing the topology display screen are performed by the user, the generation section generates a port list component representing a list of ports to which the slave device represented by the dragged device component can be connected, the port list component being provided to the slave device represented by the drop-destination device component.

In the configuration, if the slave device represented by the drop-destination device component has a plurality of ports, the user can list the ports to which the dragged device component can be connected. By performing simple operations to select a desired port from among those listed in the port list component, the user can determine to which one of the multiple ports the slave device is to be connected.

The invention can be identified as a design assistance system including at least some of those section and also can be identified as a program to cause a computer to function as the design assistance system or a computer-readable recording medium in which the program is recorded. Moreover, it can be identified also as a design assistance method including at least some of processing pieces performed by those sections. Those processing pieces and sections can be combined arbitrarily as long as no technical conflicts occur.

DESCRIPTION OF SYMBOLS

1: Design assistance system
2: Display
3: PC
4: Input device
5: Design assistance GUI
31: Storage section
32: Acquisition section
34: Generation section
51: Device list display screen
52: Topology display screen

The invention claimed is:

1. A control device of a design assistance system for designing a network system in which a master device and at least one slave device are connected to a communication bus such that the master device and the at least one slave device can communicate with each other, the network system being formed by interconnecting ports of each of the master device and the at least one slave device, the control device comprising:
- a memory configured to store slave information data in which unique information of each of the at least one slave device is described; and
- a processor configured to acquire information of a connection interface of a port of each of the at least one slave device from the slave information data,
  generate a port component serving as a first GUI component representing a type of the connection interface of the port of each of the at least one slave device based on information of the port, generate a device component serving as a second GUI component representing each of the at least one slave device based on the slave information data, and generate a design assisting GUI having a topology display screen configured to display a design of a topology of the network system, which is built by connecting the device component and the port component to each other.

2. The control device according to claim 1, wherein:
the processor acquires, as a portion of port information, information which identifies an inport to which a slave device on an upstream side of the communication bus is connected, an outport to which a slave device on a downstream side of the communication bus is connected, and a branching port at which the communication bus branches off; and
the processor generates a first hierarchy configured to display the device component representing a slave device having the branching port and the device component representing a slave device to be connected to the outport of the slave device having the branching port, and a second hierarchy configured to display the device component representing a slave device connected to the branching port.

3. The control device according to claim 2, wherein the processor expresses a connection order of slave devices by representing a parent-child relationship of the slave devices based on a positional relationship displaying the device component representing the slave device to be connected on the downstream side and the device component representing the slave device to be connected on the upstream side.

4. The control device according to claim 3, wherein the first hierarchy and the second hierarchy are displayed separately in a right-and-left direction, and the device component representing the slave device to be connected on the downstream side is displayed lower than the device component representing the slave device to be connected on the upstream side.

5. The control device according to claim 1, wherein the processor generates device components representing slave devices that are to be newly connected to the network system are listed.

6. The control device according to claim 5, wherein when any one of the listed device components which is to be newly connected to the network system is selected, connection of a slave device represented by the selected device component to a port represented by a port component specified as a connection destination is expressed.

7. The control device according to claim 5, wherein when any one of the listed device components which is to be newly connected to the network system is selected, ports provided to a slave device are listed and represented by a port component specified as a connection destination and to which a slave device represented by the selected device component is connected.

8. A design assistance system comprising:
the control device according to claim 1;
a display configured to display the design assisting GUI; and
an input device configured to receive an input to operate the design assisting GUI.

9. A design assistance system for designing a network system in which at least one slave device joins a communication bus by drawing a line, tree, or star topology from a master device as a starting point, the network system being formed by interconnecting ports of each of the master device and the at least one slave device, the design assistance system comprising:
a display configured to display a design assistance GUI;
a control device configured to control the design assistance GUI which is displayed on the display; and
an input device configured to receive an input to operate the design assistance GUI, wherein:
the control device comprises:
- a memory configured to store slave information data in which unique information of each of the at least one slave device is described; and
- a processor configured to acquire information of a port of each of the at least one slave device from the slave information data,
  generate a port component serving as a first GUI component representing a type of a connection interface of the port of each of the at least one slave device based on information of the port, generate a device component serving as a second GUI component representing each of the at least one slave device based on the slave information data, and generate a design assistance GUI containing a topology display screen configured to display a design of a topology of the network system, which includes the device component and the port component; wherein
the processor acquires information configured to identify an inport serving as a port to which a slave device serving as a parent on the communication bus is connected, an outport serving as a port to which a slave device serving as a child on the communication bus is connected, and a branching port serving as a port at which the communication bus branches off; and
the processor generates a mutually different first hierarchy and a second hierarchy in a right-and-left direction, the first hierarchy in which a device component representing the child slave device is disposed below a device component representing the parent slave device and a device component representing a branching slave device, which is a slave device having the branching port, and a device component representing the slave device which is connected to the outport of the branching slave device are disposed, and the second hierarchy in which the device component representing the slave device which is connected to the branching port of the branching slave device is disposed, on a topology display screen.

10. A design assistance system for designing a network system in which at least one slave device joins a communication bus by drawing a line, tree, or star topology from a master device as a starting point, the network system being formed by interconnecting ports of each of the master device and the at least one slave device, the design assistance system comprising:
a display configured to display a design assistance GUI;
a control device configured to control the design assistance GUI which is displayed on the display; and an input device configured to receive an input to operate the design assistance GUI, wherein:

the control device comprises:

a memory configured to store slave information data in which unique information of each of the at least one slave device is described; and a processor configured to acquire information of a port of each of the at least one slave device from the slave information data, generate a port component serving as a first GUI component representing the port of each of the at least one slave device, based on the information of the port, generate a device component serving as a second GUI component representing each of the at least one slave device, based on the slave information data, and generate a design assistance GUI containing a topology display screen configured to display a design of a topology of the network system, which includes the device component and the port component; wherein the processor generates a device list display screen displaying a list of device components representing slave devices which are designed to be newly joined to the network system and also generates the design assistance GUI containing the topology display screen and the device list display screen; and if operations to drag any one of the device components enumerated on the device list display screen and drop the dragged device component to any one of the device components composing the topology display screen are performed, the processor generates a port list component representing a list of the ports to which the slave device represented by the dragged device component can be connected, the port list component being provided to the slave device represented by the device component that is dragged and dropped.

11. A non-transitory computer-readable recording medium storing a program for designing a network system in which a master device and at least one slave device are connected to a communication bus such that the master device and the at least one slave device communicate with each other, the network system being formed by interconnecting ports of each of the master and slave devices, the program, if executed by a computer, causing the computer to:

store, in a storage, slave information data in which unique information of each of the at least one slave device is described;

acquire information of a connection interface of a port of each of the at least one slave device from the slave information data; and generate a port component serving as a first GUI component representing a type of the connection interface of a port of each of the at least one slave device based on information of the port, generate a device component serving as a second GUI component representing each of the at least one slave device based on the slave information data, and generate a design assisting GUI having a topology display screen configured to display a design of a topology of the network system, which is built by connecting the device component and the port component to each other.

12. A design assistance method for designing a network system in which a master device and at least one slave device joins a communication bus such that the master device and at least one slave device communicate with each other, the network system being formed by interconnecting ports of each of the master device and the at least one slave device, and the design assistance method causing a computer to perform:

storing slave information data in which unique information of each of the at least one slave device is described;

acquiring information of a port of each of the at least one slave device from the slave information data; and generating a port component serving as a first GUI component representing a type of a connection interface of the port of each of the at least one slave device based on information of the port, generating a device component serving as a second GUI component representing each of the at least one slave device based on the slave information data, and generating a design assisting GUI having a topology display screen configured to display a design of a topology of the network system, which is built by connecting the device component and the port component to each other.

* * * * *